(12) United States Patent
Arai et al.

(10) Patent No.: US 8,186,841 B2
(45) Date of Patent: May 29, 2012

(54) BACKLIGHT DEVICE, LIQUID CRYSTAL DISPLAY DEVICE, AND METHOD FOR ASSEMBLING BACKLIGHT DEVICE

(75) Inventors: Masahiro Arai, Tsu (JP); Kohei Nanbu, Suzuka (JP); Masaki Shimizu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 712 days.

(21) Appl. No.: 12/307,515

(22) PCT Filed: Jun. 28, 2007

(86) PCT No.: PCT/JP2007/062967
§ 371 (c)(1),
(2), (4) Date: Jan. 5, 2009

(87) PCT Pub. No.: WO2008/007560
PCT Pub. Date: Jan. 17, 2008

(65) Prior Publication Data
US 2009/0316079 A1    Dec. 24, 2009

(30) Foreign Application Priority Data

Jul. 10, 2006   (JP) .................................. 2006-188865
Jun. 22, 2007   (JP) .................................. 2007-164643

(51) Int. Cl.
*G09F 13/04* (2006.01)
(52) U.S. Cl. ....... 362/97.2; 362/600; 362/630; 362/631; 362/633; 362/634; 439/56; 439/168; 439/220; 439/541
(58) Field of Classification Search ................. 362/97.1, 362/97.2, 217.08, 217.09, 219, 221, 225, 362/260, 600, 614, 630, 631, 633, 634; 439/56, 439/168, 220, 541
See application file for complete search history.

(56) References Cited

U.S. PATENT DOCUMENTS 5,971,567 A * 10/1999 Van Duijneveldt .......... 362/97.1
6,962,429 B2 * 11/2005 Yamamoto .................... 362/614
(Continued)

FOREIGN PATENT DOCUMENTS
JP          6-88006 U       12/1994
(Continued)

OTHER PUBLICATIONS
Supplementary European Search Report issued on Dec. 8, 2011.

*Primary Examiner* — Douglas W Owens
*Assistant Examiner* — Thai Pham
(74) *Attorney, Agent, or Firm* — Birch, Stewart, Kolasch & Birch LLP

(57) ABSTRACT

A fluorescent tube is prevented from being wrongly attached and broken when being attached, and luminance nonuniformity of backlight due to luminance difference generated in a tube axis direction of the fluorescent tube is reduced. A backlight device 2 is provided with a plurality of fluorescent tubes 21 having electrodes 211 at both ends; a bundling member 213 for bundling wirings 212 pulled out from the electrode 211 on one side of two or more of the fluorescent tubes 21; and a conducting means 31 for achieving conduction between the electrodes of the two fluorescent tubes among the fluorescent tubes 21 by being connected with the bundling member 213. The conducting means 31 permits a current to be carried between the electrodes of the two fluorescent tubes 21, which are bundled by the one bundling member 213, and the conducting means are arranged on inverter circuit substrate 28, respectively, not to be adjacent to each other.

12 Claims, 13 Drawing Sheets

U.S. PATENT DOCUMENTS

| | | | |
|---|---|---|---|
| 7,806,544 B2 * | 10/2010 | Kim et al. | 362/97.1 |
| 7,854,541 B2 * | 12/2010 | Kim | 362/646 |
| 2002/0130628 A1 | 9/2002 | Shin | |
| 2003/0015966 A1 | 1/2003 | Youn et al. | |
| 2004/0155601 A1 * | 8/2004 | Chou et al. | 315/291 |
| 2004/0232854 A1 * | 11/2004 | Chou | 315/291 |
| 2004/0246394 A1 * | 12/2004 | Ono et al. | 349/53 |
| 2004/0257793 A1 | 12/2004 | Wakabayashi | |
| 2005/0269976 A1 | 12/2005 | Chou et al. | |
| 2006/0061982 A1 * | 3/2006 | Lee | 362/29 |

FOREIGN PATENT DOCUMENTS

| | | |
|---|---|---|
| JP | 7-301797 A | 11/1995 |
| JP | 3029267 U | 7/1996 |
| JP | 2002-100205 A | 4/2002 |
| JP | 2002-231034 A | 8/2002 |
| JP | 2002-367425 A | 12/2002 |
| JP | 2005-268028 A | 9/2005 |

* cited by examiner (A)

(B)

(A)

(B)

BACKLIGHT DEVICE, LIQUID CRYSTAL DISPLAY DEVICE, AND METHOD FOR ASSEMBLING BACKLIGHT DEVICE

TECHNICAL FIELD

The present invention relates to a backlight device having a plurality of fluorescent tubes driven by inverter circuits, a liquid crystal display device using the backlight device, a method for assembling the backlight device, and a substrate device for connecting fluorescent tubes.

BACKGROUND OF THE INVENTION

Recently, as liquid crystal display televisions increase in size, larger-size backlights are required. To meet the needs of growth in size as well as energy saving and price reduction, U-shaped or square-U-shaped bent-tube fluorescent lamps are produced by bending approximately center portions of long straight-tube fluorescent lamps to develop a backlight using these bent-tube fluorescent lamps as light sources instead of conventional straight-tube fluorescent lamps.

In the case of a backlight using the bent-tube fluorescent lamps, since relatively uniform temperature distribution is generated on screen less than 17-inch size, problems are less likely to occur although small differences are generated in temperature and luminance in the tube axis direction. However, as screens are further increased in size, temperature becomes higher in lamp electrode portions that are main heat generation sources as well as voltages applied to the lamps are increased due to longer lengths of the lamps, and leak currents tend to be generated near high pressure portions because of resultant stray capacitances between lamps and units. Because of increase in electric power for inverters due to increase in electric power for the lamps, the inverters located on the back sides of the lamp electrode portions generate more heat. As a result, temperature differences are increased in the lamp tube axis direction.

Since the leak current is generated, a lamp is lighted, near the high pressure portion in the tube axis direction, by a current value that is a sum of the rated current and the leak current, and this causes a luminance difference in the tube axis direction. The differences in temperature and luminance tend to increase in the tube axis direction due to larger sizes of the backlights as above, resulting in backlight luminance nonuniformity.

Therefore, a backlight has been proposed to apply light with uniform luminance even in the case of large-size liquid crystal displays (see, e.g., Patent Document 1). This proposition reduces a tube wall temperature difference in a lamp tube axis direction and a surface direction and reduces a luminance difference on a surface by alternatively arranging electrodes and bent portions of bent-tube fluorescent lamps and by disposing inverters immediately under respective reflection cases on the electrode feeding sides of the fluorescent lamps.

However, in the case of the invention described in Patent Document 1, although fluorescent tubes longer than at least the width of a screen are required, it is difficult to organize a sufficiently stable supplying system for a large screen size (e.g., 40-inch or more) because of the poor productivity in the bending process for the fluorescent tubes and the reduction in the manufacturing efficiency due to the longer lengths of the fluorescent tubes. The fluorescent tubes must be horizontally arranged because of preventing mercury, etc., within the fluorescent tubes from being unevenly distributed.

Therefore, recently, as described in Patent Document 2, a fluorescent tube drive mode in which two fluorescent tubes having lengths equivalent to screen width are connected in series and lighted is frequently employed, and the length may not be elongated more than necessary in this mode even in the case of fluorescent tubes mounted on backlights corresponding to large-size televisions. Large-size backlight devices may be produced making use of this advantage.

Patent Document 1: Japanese Laid-Open Patent Publication No. 2005-268028
Patent Document 2: Japanese Laid-Open Patent Publication No. 2002-231034

DISCLOSURE OF THE INVENTION

Problems to be Solved by the Invention

However, in the case of the configuration of Patent Document 2, a fluorescent tube unit must be prepared in advance, in which each fluorescent tube electrically directly interconnected to another fluorescent tube through wires (e.g., members such as 223c and 225c of FIG. 8 of Patent Document 2). Since the number of wires necessary for linking the fluorescent tubes increases as the number of fluorescent tubes increases in this configuration and the orientations of the fluorescent tubes arranged in the backlight are fixed due to this linking configuration, when arranging fluorescent tubes with the length of 80 to 150 cm, for example, in a backlight chassis, a worker must always be mindful that in which orientation the linking configuration of fluorescent-units having the length comparable to the worker's height should be arranged in the chassis at the time of assembling, which is the cause of preventing prompt assembly action to the next working process and preventing improvement in the manufacturing efficiency.

Especially, since the invention described in Patent Document 1 requires an operation of alternately arranging the bent portions of the fluorescent tube units in the direction of arrangement of lamps, when U-shaped lamp units are mounted on the backlight, if it is attempted to arrange the units in the correct order within a reflection case, etc., the lamps must be arranged such that the lamp electrodes of a second lamp are positioned oppositely to the lamp electrodes of a first lamp connected to an inverter circuit. Since this operation often involves an operation of counting the number of attached lamps and an operation of changing the way of holding a lamp, it takes a lot of trouble to mount the lamp units, which may induce problems of mounting errors or damages of lamps. This causes prominent problems especially when mounting backlight fluorescent tubes having the diameter of about 2 to 5 mmφ and the length in the order of several tens of centimeters to several meters. Therefore, the fluorescent linking configuration as in Patent Document 2 may cause reduction at least in the operating efficiency.

The present invention was conceived in view of the above situations and it is therefore an object of the present invention to provide a backlight device of the fluorescent tube drive mode for lighting the fluorescent tubes connected in series, which is simply assembled using a method that hardly causes the mounting errors or damages of fluorescent tubes at the time of the fluorescent-tube mounting operation without assembly operations always requiring the mindfulness to the orientation of arrangement of the fluorescent tubes or the operation of counting the number of attached lamps and the operation of changing the way of holding a lamp. It is an object of the present invention to provide a backlight device capable of reducing or eliminating the luminance nonuniformity of the backlight due to a luminance difference generated in the fluorescent-tube axis direction, a liquid crystal display device using the backlight device, a method for assembling a backlight device, and a substrate device for connecting fluorescent tube.

It is an object of the present invention to provide a backlight device using a simpler assembly process without increase in the number of components due to the linking configuration even when the number of fluorescent tubes increases in accordance with the increase in screen size of the backlight.

Means for Solving the Problems

In order to solve the above problem, a first technical means of the present invention is a backlight device having a plurality of fluorescent tubes, arranged side-by-side with electrodes at both ends, which includes: a bundling member that bundles wirings pulled out from electrodes at one end of two or more of the fluorescent tubes; and a conducting means connected to the bundling member to achieve conduction between the electrodes of two of the fluorescent tubes.

A second technical means is the backlight device as defined in the first technical means, wherein the conducting means is provided on a pair of substrates for generating or transmitting alternating voltages for lighting the plurality of the fluorescent tubes.

A third technical means is the backlight device as defined in the second technical means, wherein the conducting means is made up of a conductor provided on the substrates.

A fourth technical means is the backlight device as defined in the second or the third technical means, wherein the conducting means achieve conduction between two electrodes of the fluorescent tubes bundled by one bundling member.

A fifth technical means is the backlight device as defined in the fourth technical means, comprising a connecting member for detachably connecting the bundling member, wherein the connecting member is made up of a first connecting member connected to a transformer on the substrate and a second connecting member connected to the conducting means, and the first connecting members and the second connecting members are alternately mounted on each of the pair of the substrates.

A sixth technical means is the backlight device as defined in the second or the third technical means, wherein the conducting means achieves conduction between electrodes of two connecting members provided for detachably connecting the bundling members mounted on the same substrate.

A seventh technical means is the backlight device as defined in the sixth technical means, wherein the two connecting members are adjacently mounted in the fluorescent-tube arrangement direction.

An eighth technical means is the backlight device as defined in the sixth or the seventh technical means, wherein the two fluorescent tubes made conductive by the conducting means are arranged to sandwich another fluorescent tube.

A ninth technical means is the backlight device as defined in the eighth technical means, wherein the number of another fluorescent tube sandwiched between the two fluorescent tubes is one.

A tenth technical means is the backlight device as defined in the second or the third technical means, wherein the conducting means achieve the conduction between any one of the electrodes of the fluorescent tubes bundled by one bundling member of the two adjacent bundling members and one of the electrodes of the fluorescent tubes bundled by the other bundling member with one fluorescent tube disposed between both electrodes and are arranged such that no overlapping occurs on each of the pair of the substrates.

An eleventh technical means is the backlight device as defined in any one of the sixth to the tenth technical means, wherein at least a portion of the conducting means is wired within a transformer mounting area on each of the pair of the substrates.

A twelfth technical means is the backlight device as defined in any one of the sixth to the ninth technical means, wherein the connecting member includes a first connecting terminal connected to a transformer on the substrate and a second connecting terminal connected to the conducting means.

A thirteenth technical means is the backlight device as defined in any one of the second to the twelfth technical means, wherein the fluorescent tubes made conductive by the conducting means are driven by applying to any one electrode thereof an alternating voltage signal generated by a transformer on the substrate.

A fourteenth technical means is the backlight device as defined in any one of the second to the twelfth technical means, wherein the fluorescent tubes made conductive by the conducting means are driven by concurrently applying two alternating voltage signals with different phases generated by a transformer on the substrate to two electrodes thereof different from the electrodes used for making the conductive state.

A fifteenth technical means is the backlight device as defined in any one of the second to the fourteenth technical means, wherein each of the pair of the substrates is provided on the surface opposite to the disposition surface of the plurality of the fluorescent tubes and is disposed in the vicinity of the electrodes at both ends of the plurality of the fluorescent tubes.

A sixteenth technical means is a liquid crystal display device including the backlight device as defined in any one of the first to the fifteenth technical means and a liquid crystal panel illuminated by the backlight device.

A seventeenth technical means is a method for assembling a backlight device having a plurality of fluorescent tubes, arranged side-by-side with electrodes at both ends, wherein conduction between the electrodes of two of the plurality of the fluorescent tubes is achieved by connecting a bundling member that bundles wirings pulled out from electrodes at one end of two or more of the plurality of the fluorescent tubes.

An eighteenth technical means is the method for assembling a backlight device as defined in the seventeenth technical means, wherein conducting means for achieving conduction between two electrodes of the fluorescent tubes bundled by one bundling member are arranged not adjacently to each other on each of the pair of substrates that generates or transmits alternating voltages for lighting the plurality of the fluorescent tubes.

A nineteenth technical means is the method for assembling a backlight device as defined in the eighteenth technical means, wherein a connecting member for detachably connecting the bundling member is made up of a first connecting member connected to a transformer on the substrate and a second connecting member connected to the conducting means, and the first connecting members and the second connecting members are alternately mounted on each of the pair of the substrates.

A twentieth technical means is the method for assembling a backlight device as defined in the seventeenth technical means, wherein conducting means achieve the conduction between any one of the electrodes of the fluorescent tubes bundled by one bundling member of the two adjacent bundling members and one of the electrodes of the fluorescent tubes bundled by the other bundling member with one fluorescent tube sandwiched between both electrodes and are arranged such that no overlapping occurs on each of the pair of the substrates that generates or transmits alternating voltages for lighting the plurality of the fluorescent tubes.

A twenty-first technical means is the method for assembling a backlight device as defined in the twentieth technical means, wherein at least a portion of the conducting means is wired within a transformer mounting area on each of the pair of the substrates.

A twenty-second technical means is the method for assembling a backlight device as defined in the twentieth or the twenty-first technical means, wherein a connecting member for detachably connecting the bundling member is alternately provided with a first connecting terminal connected to a transformer on the substrate and a second connecting terminal connected to the conducting means.

A twenty-third technical means is a backlight device having a plurality of fluorescent tubes with electrodes at both ends which are arranged in parallel with one end and the other end of each fluorescent tube aligned, wherein the plurality of the fluorescent tubes are connected in series and, an electrically connecting means for electrically connecting the other end of the fluorescent tube to the other end of the other fluorescent tube connected to the fluorescent tube in series are provided on a substrate.

A twenty-fourth technical means is the backlight device as defined in the twenty-third technical means, wherein the plurality of fluorescent tubes makes up a plurality of fluorescent tube units driven in series, and wherein the substrate comprises a first substrate including an electrically connecting means for electrically connecting one fluorescent tube unit on one end side and a second substrate including an electrically connecting means for electrically connecting the other fluorescent tube unit on the other end side.

A twenty-fifth technical means is the backlight device as defined in the twenty-fourth technical means, wherein one of the fluorescent tubes making up the one fluorescent tube unit is located and driven between the two fluorescent tubes making up the other fluorescent tube unit.

A twenty-sixth technical means is the backlight device as defined in any one of the twenty-third to the twenty-fifth technical means, wherein the electrically connecting means is composed of printed wirings.

A twenty-seventh technical means is the backlight device as defined in any one of the twenty-third to the twenty-fifth technical means, wherein more than two electrically connecting means are included in series on the substrate in the arrangement direction of the fluorescent tubes.

A twenty-eighth technical means is the backlight device as defined in any one of the twenty-third to the twenty-fifth technical means, wherein alternating voltage signals in opposite phase are supplied to one end of the fluorescent tube and one end of the other fluorescent tube connected in series.

A twenty-ninth technical means is the backlight device as defined in any one of the twenty-third to the twenty-fifth technical means, wherein the substrate includes at least either a high-voltage wiring or an inverter transformer for supplying the alternating voltage signals on one end side of the fluorescent tubes.

A thirtieth technical means is the backlight device as defined in any one of the twenty-third to the twenty-fifth technical means, wherein two or more of the fluorescent tubes include a pair of bundling members for bundling one end side and the other end side respectively.

A thirty-first technical means is the backlight device as defined in any one of the twenty-third to the twenty-fifth technical means, wherein the substrate is disposed on the inside of a housing of the backlight device.

A thirty-second technical means is the backlight device as defined in the twenty-fourth or the twenty-fifth technical means, wherein the fluorescent tube units connected by a plurality of the electrically connecting means provided on the substrate are driven in parallel with each other.

A thirty-third technical means is a substrate device for connecting fluorescent tube for electrically connecting a plurality of fluorescent tubes with electrodes at both ends arranged in parallel with one end and the other end of each fluorescent tube aligned, wherein an electrically connecting means for electrically connecting the other end of the fluorescent tube to the other end of the other fluorescent tube connected to the fluorescent tube in series is provided and, the plurality of the fluorescent tubes are connected in series and, an alternating voltage is supplied to one end of at least one fluorescent tube of the plurality of the fluorescent tubes.

A thirty-fourth technical means is the substrate device for connecting fluorescent tube as defined in the thirty-third technical means, wherein the electrically connecting means is composed of printed wirings.

A thirty-fifth technical means is the substrate device for connecting fluorescent tube as defined in the thirty-third technical means, wherein more than two electrically connecting means are arranged on the substrate device for connecting fluorescent tube in the arrangement direction of the fluorescent tubes.

A thirty-sixth technical means is the substrate device for connecting fluorescent tube as defined in the thirty-third technical means, which comprises at least either a high-voltage wiring or an inverter transformer for supplying the alternating voltage to one end side of at least one of the plurality of the fluorescent tubes.

EFFECTS OF THE INVENTION

The present invention may provide a backlight device of the fluorescent tube drive mode for lighting the fluorescent tubes connected in series, wherein the mounting errors or damages of fluorescent tubes are hardly occurred at the time of the fluorescent-tube mounting operation because of eliminating the operation of counting the number of attached lamps and the operation of changing the way of holding a lamp and the luminance nonuniformity of the backlight due to a luminance difference generated in the fluorescent-tube axis direction can be reduced or eliminated and also may provide, a liquid crystal display device using the backlight device, a method for assembling a backlight device, and a substrate device for connecting fluorescent tube.

According to the present invention, U-shaped fluorescent tube units connected in series may be driven with a simpler assembly configuration and, particularly, since a worker may perform the assembly without being always mindful of the orientation of fluorescent tubes to be arranged, the efficiency of operation may be improved. Since a configuration of electrically connecting a plurality of fluorescent tubes only with a harness is no longer used, the assembly may be performed without being mindful of the orientation of fluorescent tubes to be mounted on a housing, etc., of the backlight.

According to the present invention, since a relay substrate may not be formed as a GND terminal and wiring is not necessary for stabilizing the GND potential of the relay substrate by connecting it with a high-voltage supplying substrate such as an inverter substrate, a simple configuration is available.

According to the present invention, since the U-shaped fluorescent tubes connected in series are driven, the U-tubes themselves are not used and the effective emission regions of the fluorescent tubes may effectively be utilized to provide the backlight capable of sufficiently supporting large-size liquid crystal panels.

According to the present invention, a sufficiently high voltage may be supplied even to the fluorescent tubes connected in series, and the luminance nonuniformity may easily be controlled in the longitudinal direction of the fluorescent tubes connected in series.

The present invention may provide a backlight device having a further improved ability of canceling the luminance nonuniformity.

EXPLANATIONS OF REFERENCE NUMERALS

1 . . . liquid crystal panel; 2 . . . backlight device; 3, 4 . . . frame; 5 . . . holding member; 6 . . . lamp holder; 21 . . . fluorescent tube; 22 . . . reflection sheet; 23 . . . housing; 24 . . . diffusion plate; 25 . . . diffusion sheet; 26 . . . prism sheet, 27 . . . reflective polarization plate; 28 . . . inverter circuit substrate; 29 . . . inverter transformer; 30 . . . connecting member (first connecting member, second connecting member); 31 . . . conducting means (electrically connecting means); 32 . . . high-voltage wiring; 101 . . . oscillation circuit; 102 . . . switch circuit; 103 . . . phase inversion circuit; 211 . . . electrode; 212 . . . wiring; and 213 . . . bundling member.

PREFERRED EMBODIMENTS OF THE INVENTION

Preferred embodiments of a backlight device, a liquid crystal display device using the backlight device, and a method for assembling a backlight device of the present invention will now be described with reference to the accompanying drawings. Components having the same functions are given the same reference numbers and will not repeatedly be described.

Figure 1:
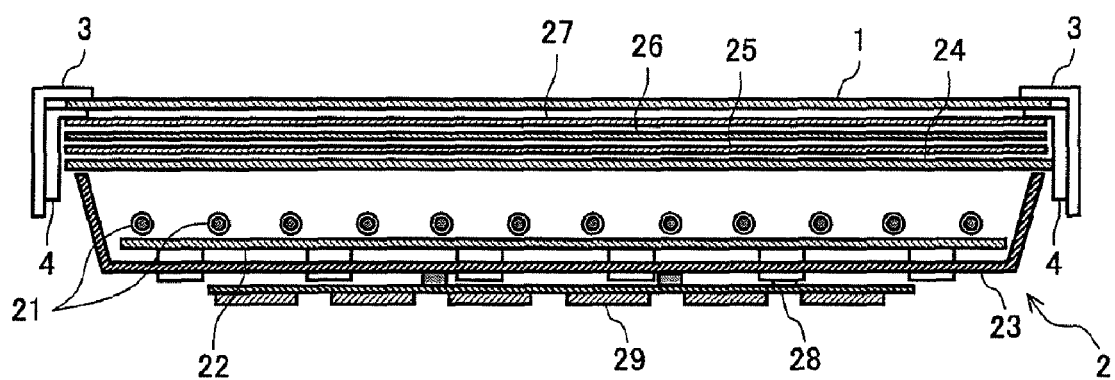
FIG. 1 is a cross-section view of an exemplary configuration of a liquid crystal display device using a backlight device of the present invention.

FIG. 1 is a cross-section view of an exemplary configuration of a liquid crystal display device using a backlight device of the present invention. In FIG. 1, the liquid crystal display device includes a liquid crystal panel 1 and a backlight device 2 as main components. The liquid crystal panel 1 executes a video displaying processing for supplying a predetermined gradation voltage for each pixel of a video signal obtained by executing a video signal processing in accordance with a clock signal of the crystal panel 1 and giving a sequential scan on a screen to display a video corresponding to the video signal. The backlight device 2 applies light from the opposite side of the display surface. The light sources of the backlight device 2 may be fluorescent tubes such as cold cathode fluorescent lamps (CCFL), for example.

The backlight device 2 is composed of a plurality of fluorescent tubes 21 for supplying light to the liquid crystal panel 1, a reflection sheet or reflection plate (hereinafter, represented by the reflection sheet) 22 for effectively applying the light emitted by the fluorescent tubes 21 to the liquid crystal panel 1, and a housing 23 for containing these components. The back surface of the housing 23 (i.e., the surface opposite to the surface disposed with the fluorescent tubes 21) is disposed with an inverter circuit substrate 28 (inverter circuit 28) for mounting an inverter circuit. The inverter circuit 28 is provided with a component such as an inverter transformer 29 as a boosting circuit that supplies electric power to the fluorescent tubes 21. The inverter transformer 29 may be a wound transformer that transforms voltage in accordance with the electromagnetic induction effect of two coils based on the ratio of number of turns of the coils.

The inverter circuit 28 may be a separately-excited inverter. The separately-excited inverter is generally disposed with an oscillation circuit on the primary side to perform conversion into the same frequency as the drive frequency of the oscillation circuit and when the separately-excited inverter is utilized to drive the above wound inverter transformer 29, a smaller inverter may be realized as a wound inverter having efficiency higher than piezoelectric-type inverters.

The liquid crystal panel 1 is composed of two glass substrates with polarization plates in the crossed-Nicols relationship having a liquid crystal layer therebetween, and the liquid crystal panel 1 is fixed and held by two frames 3 and 4 along the thickness. The frames 3 and 4 have a configuration with a cross-section bent in a substantially L-shape such that the backlight device 2 is entirely covered.

The fluorescent tubes 21 composing the backlight device 2 have a linear shape and are disposed such that the linear portions thereof are located parallel with each other. The shape of the reflection sheet 22 may have a flat shape as shown in FIG. 1 or may have a shape with an uneven cross-section.

Various optical members may further be provided depending on optical performance necessary for the liquid crystal display device. For example, as shown in FIG. 1, the light source composed of a plurality of fluorescent tubes 21 is provided with a diffusion plate 24 for alleviating a luminance difference between the positions disposed with the fluorescent tubes 21 and other positions, a diffusion sheet 25 for supplying optimum light distribution characteristics for a required usage pattern, a prism sheet 26 for concentrating light in a certain direction, a reflective polarization plate 27 for selectively transmitting/reflecting the polarized wave of the light in a certain direction to improve the polarization level of the light incident on the liquid crystal panel 1, and the like. These various optical members (such as the diffusion plate 24, the diffusion sheet 25, the prism sheet 26, and the reflective polarization plate 27) are formed in a plate shape or a sheet shape and are disposed between the fluorescent tubes 21 and the liquid crystal panel 1.

The fluorescent tubes 21 excite mercury within the fluorescent tubes 21 with a high alternating voltage supplied to electrodes from the inverter transformers 29 of the inverter circuits 28 disposed in parallel on the back surface of the back light device 2 to emit light near ultraviolet according to the energy level of the excited mercury, and the ultraviolet light causes three-colored fluorescent materials of red, blue, and green of the fluorescent tubes 21 to emit lights, which are mixed to supply white light. The white light emitted in this way is controlled in the light distribution characteristics by the above various optical members and the light may effectively be supplied to the liquid crystal panel 1. The supply of light from the backlight device 2 controls brightness of pixels based on the light transmission rates corresponding to the gradation voltages at the pixels of the liquid crystal panel 1 to display a video on the screen.

Embodiments will hereinafter be described for a backlight device of the fluorescent tube drive mode for lighting the fluorescent tubes connected in series, in which the mounting errors or damages of fluorescent tubes are occurred at the time of the fluorescent-tube mounting operation because of eliminating the operation of counting the number of attached lamps and the operation of changing the way of holding a lamp and the luminance nonuniformity of the backlight due to a luminance difference generated in the fluorescent-tube axis direction can be reduced or eliminated.

First Embodiment

Figure 2:
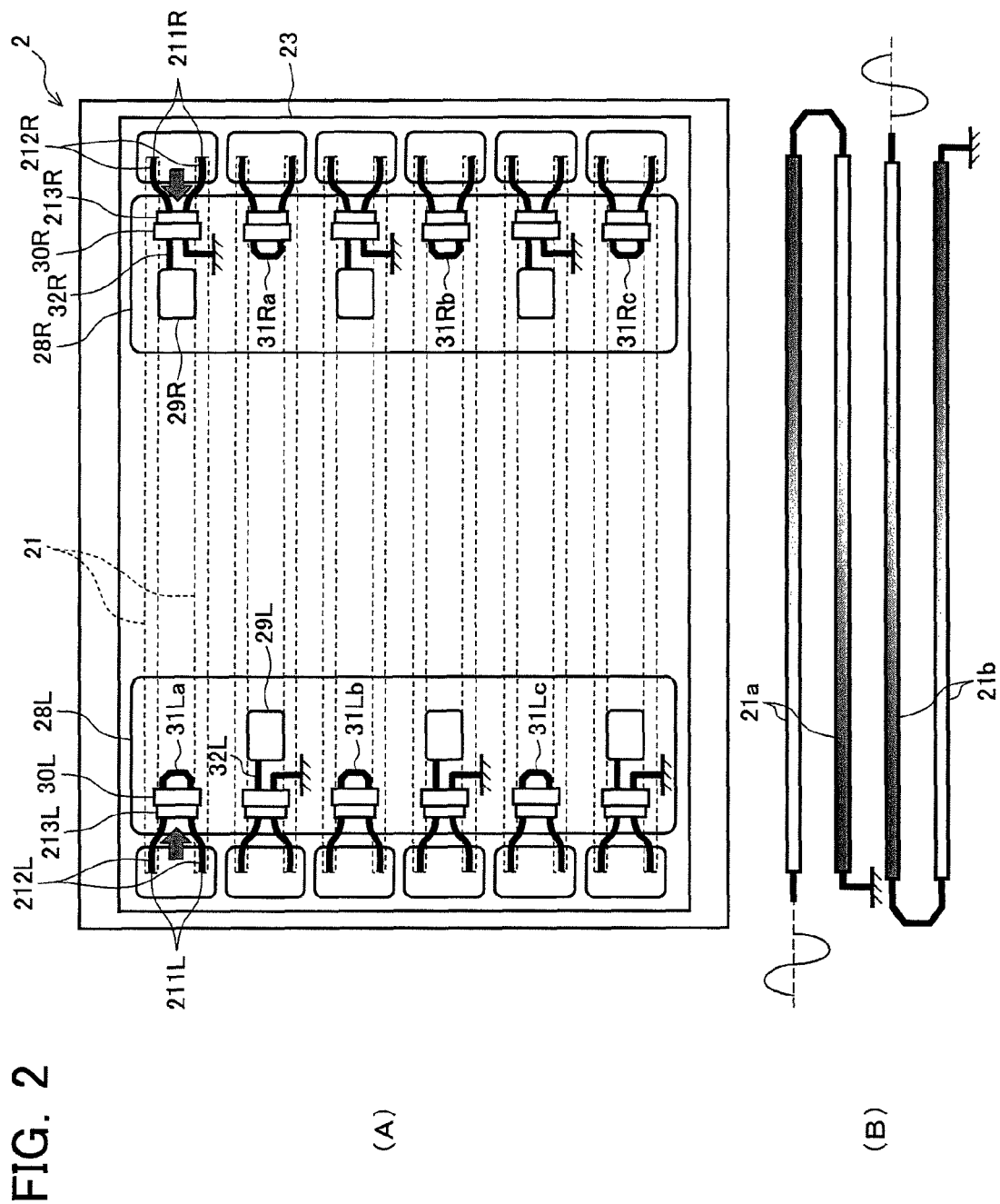
FIG. 2 is a view of an exemplary configuration of a backlight device according to a first embodiment of the present invention.

FIG. 2 is a view of an exemplary configuration of a backlight device 2 according to a first embodiment of the present invention. In FIG. 2(A), 211 (211R, 211L) denotes electrodes at both ends of the fluorescent tubes 21; 212 (212R, 212L) denotes wirings from the electrodes 211; and 213 (213R, 213L) denotes bundling members that bundles the wirings 212. The backlight device 2 includes the bundling member 213 that bundles the wirings 212 pulled out from the electrodes 211 at one end of two or more of the fluorescent tubes 21 and a conducting means 31 (31R, 31L) connected to the bundling member 213 to achieve conduction between the electrodes of two of the fluorescent tubes 21, and the conducting means 31 achieves conduction between the electrodes 211 at one end of the two fluorescent tubes 21. The bundling members 213 bundle the electrodes 211 at both ends in this embodiment to connect the electrodes 211 at one end to the conducting means 31 through the bundling member 213 and to connect one of the electrodes 211 at the other end through the bundling member 213 to the inverter transformer 29.

The backlight device 2 includes a pair of the inverter circuit substrates 28 (28R, 28L) for generating or transmitting the alternating voltage for lighting a plurality of fluorescent tube units, inverter transformers 29 (29R, 29L) disposed on the inverter circuit substrates 28, connecting members 30 (30R, 30L) detachably connected to the bundling members, and high-voltage wirings 32 (32R, 32L) pulled out from the connecting members 30 and connected to the inverter transformers 29, and the conducting means 31 are disposed so as not to be located adjacently to each other on the inverter circuit substrates 28. The inverter transformers 29 and the conducting means 31 are alternately disposed on the inverter circuit substrates 28.

The inverter circuit substrate 28 corresponds to a substrate device for connecting fluorescent tube of the present invention.

The conducting means 31 is, for example, a conductor provided on the inverter circuit substrate 28 and is formed by printing a pattern on the substrate. For example, a printed substrate may be used. Therefore, since the conducting means 31 does not increase the thickness of the substrate and no special operation is necessary for mounting the conducting means 31, the conducting means 31 may preferably be applied to large-size backlights, and the luminance nonuniformity in the tube axis direction may be eliminated with a simple configuration.

In view of the object of the conducting means 31, the configuration of the wirings may be a configuration creating a state of "electrically connecting" the fluorescent tubes, and the conducting means is also referred to as an electrically connecting means in some cases. Therefore, the complete conduction may not necessarily be achieved between the electrodes to be connected only be the wirings, and both electrodes are electrically connected through ballast components such as condensers, coils, and transformers. Therefore, the substrate may be utilized for the mounting design for components to be mounted for other objects. For example, when inverter transformers, etc., are mounted for supplying a high alternating voltage to two other fluorescent tubes driven in a U-shape in a direction opposite to the two fluorescent tubes driven in a U-shape, this configuration is suitable for a mode of reversing and alternately driving the U-shaped drive of the fluorescent tubes in the arrangement direction of the lamps (see FIG. 3(B), etc.) while effectively utilizing the substrate. This configuration is also suitable for the purpose of, for example, mounting circuits for detecting damages of fluorescent tubes or detecting a current value other than inverter transformers.

The connecting member 30 is composed of a first connecting member connected to the inverter transformer 29R and a second connecting member connected to the conducting means 31L, and the first connecting members and the second connecting members are alternately mounted on the inverter circuit substrates 28. The first connecting member is connected to the inverter transformer 29R on the inverter circuit substrate 28R to supply the high alternating voltage from the inverter transformer 29R to one electrode of the electrodes 211R of the fluorescent tube unit when the one bundling member 213R is connected. The second connecting member is connected to the conducting means 31L to achieve conduction between the electrodes 211L of the fluorescent tube unit when the other bundling member 213L is connected.

In FIG. 2(A), a set of fluorescent tubes composed of the two fluorescent tubes 21 and the two bundling members 213 is defined as a fluorescent tube unit, and six fluorescent tube units (12 fluorescent tubes 21) are arranged side-by-side. A pair of the inverter circuit substrates 28 is provided on the surface opposite to the disposition surface of a plurality of the fluorescent tubes and is located near the electrodes at both ends of the fluorescent tube units.

The one inverter circuit substrate 28R is alternately disposed with the high-voltage electrodes (on the side connected to the inverter transformers 29R) and the low-voltage electrodes (on the side connected to the conducting means 31R) of the fluorescent tube units from the top. Similarly, the other inverter circuit substrate 28L is alternately disposed with the low-voltage electrodes (on the side connected to the conducting means 31L) and the high-voltage electrodes (on the side connected to the inverter transformers 29L) of the fluorescent tube units.

By arranging a plurality of the conducting means, namely, the electrically connecting means 31L in the arrangement direction of the fluorescent tubes on the substrate, a particular effect may be achieved that the troublesome work of providing more parts for the substrate than necessity may be avoided when a plurality of wirings acting as the electrically connecting means is necessary on one end side or the other end side of the fluorescent tubes.

In this embodiment, the high alternating voltage from the inverter transformer 29 is supplied to either one electrode of the two electrodes 211 on the high-voltage side (the side connected to the inverter transformer 29) of the fluorescent tube unit and the other electrode is grounded. Therefore, the fluorescent tube unit is driven on one side by the inverter transformer 29.

The first connecting member and the second connecting member composing the connecting member 30 are detachably connected to the bundling member 213. The second connecting member connected to the conducting means 31 may not be mounted on the inverter circuit substrate and may be made as a relay substrate different from the inverter circuit substrate to dispose the inverter circuit substrate and the relay substrate on one end side and the other end side, respectively, of the fluorescent tubes arranged in parallel. In this case, as exemplarily illustrated by a plurality of conducting means (31La to 31Lc) mounted on the substrate 28L of FIG. 2, by considering the substrate 28L as a relay substrate and by giving a plurality of wirings to the conducting means (31La to 31Lc) mounted on the relay substrate in the arrangement direction of the fluorescent tubes, a relatively simple component configuration may be achieved such that a plurality of fluorescent tubes disposed in parallel may be connected in series at a plurality of positions on one relay substrate. The conducting means may be those capable of achieving conduction between the electrodes on the low-voltage side of the fluorescent tube units when connected to the bundling members 213 and may be those capable of forming the fluorescent tube electrodes to the state connected in series as a result of engagement with the bundling members.

The substrate 28R composing the pair of the inverter circuit substrates 28 along with the substrate 28L is similarly disposed with a plurality of conducting means (31Ra to 31Rc) in the arrangement direction of the fluorescent tubes.

The connecting member 30 and the bundling member 213 are, for example, a socket (the reception side) and a plug (the insertion side), respectively, and when the socket and the plug are connected, one electrode of the fluorescent tube unit is electrically connected to the inverter transformer 29 and the conduction is achieved between the electrodes on the other side of the fluorescent tube unit. The socket and the plug can be inverted. In this case, the connecting member 30 is a plug and the bundling member 213 is a socket.

The above configuration can acquire the same effect as that acquired by alternately disposing the electrode sides and the bent sides of the conventional bent-tube fluorescent lamps. Since the high-voltage sides and the low-voltage sides of fluorescent tube units (21$a$, 21$b$) are alternately disposed as shown in FIG. 2(B), the luminance difference in the tube axis direction may be reduced and the backlight luminance nonuniformity may be reduced or eliminated. Particularly, if the floating drive is performed for two conducting fluorescent tubes, a higher luminance nonuniformity canceling effect may be acquired.

When the fluorescent tube unit composed of the two fluorescent tubes 21 and the two bundling members 213 is disposed on the backlight device 2 of the fluorescent tube drive mode for lighting the fluorescent tubes connected in series, since no consideration is required for the positions of the electrodes as in the case of bent-tube fluorescent lamps in a U-shape, etc., the operation of counting the number of attached lamps and the operation of changing the way of holding a lamp are not generated and the disposition work becomes easier. When the disposed fluorescent tube unit is connected to the inverter circuit substrate 28, the bundling member 213 of the fluorescent tube unit may simply be attached to the connecting member 30 of the inverter circuit substrate. Therefore, producing workers, etc., may prevent mounting errors or damages of lamps and may easily and certainly perform the attachment work when arranging the fluorescent tubes.

Since the bending configuration is employed in the case of the conventional bent-tube fluorescent lamps, the total length in the longitudinal direction is about a half of the length of the same straight-tube fluorescent lamps, which constrains the enlargement of the size of screen. On the other hand, the backlight device 2 according to the present invention may support larger-size screens since the straight-tube fluorescent lamps are used.

Second Embodiment

Figure 3:
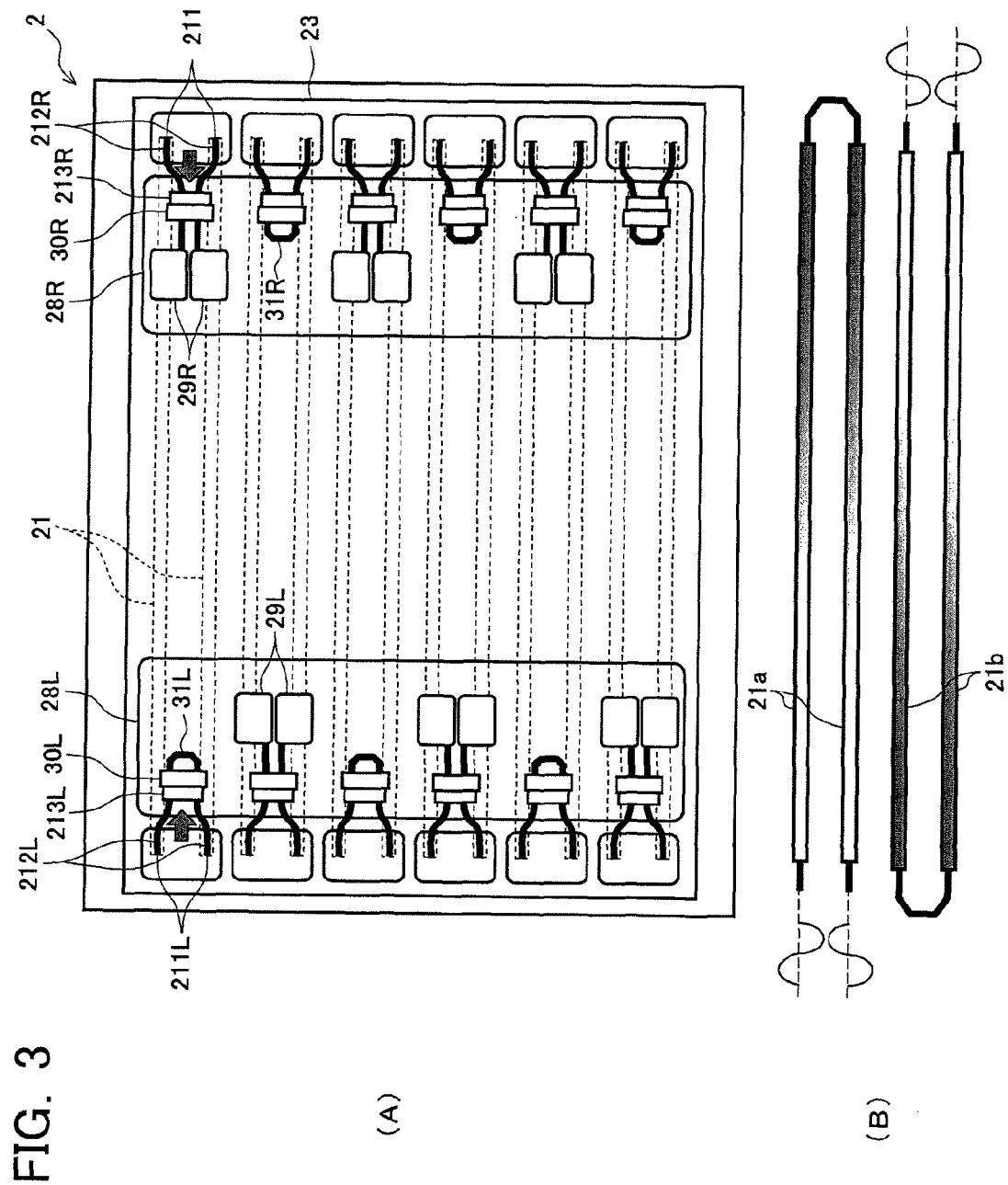
FIG. 3 is a view of an exemplary configuration of a backlight device according to a second embodiment of the present invention.

FIG. 3 is a view of an exemplary configuration of the backlight device 2 according to a second embodiment of the present invention. In FIG. 3(A), the backlight device 2 has the same configuration as that of the first embodiment except that the inverter transformer 29 and the first connecting member 30 have different configurations. The first connecting member 30 of this embodiment is connected to the bundling member 213 from the fluorescent tube unit and supplies the high alternating voltage from the inverter transformer 29 on the inverter circuit substrate 28 to both of the electrodes 211 of the fluorescent tube unit. The inverter transformer 29 may be disposed one for each of the both electrodes 211 to supply the high alternating voltage to the both electrodes 211. Therefore, the fluorescent tube unit is driven on both sides by the two inverter transformers 29.

The above configuration can acquire the same effect as that acquired by alternately disposing the electrode sides and the bent sides of the conventional bent-tube fluorescent lamps. Since the high-voltage sides and the low-voltage sides of fluorescent tube units (21$a$, 21$b$) are alternately disposed as shown in FIG. 3(B), the luminance difference in the tube axis direction may be reduced and the backlight luminance nonuniformity may be reduced or eliminated.

Third Embodiment

Figure 4:
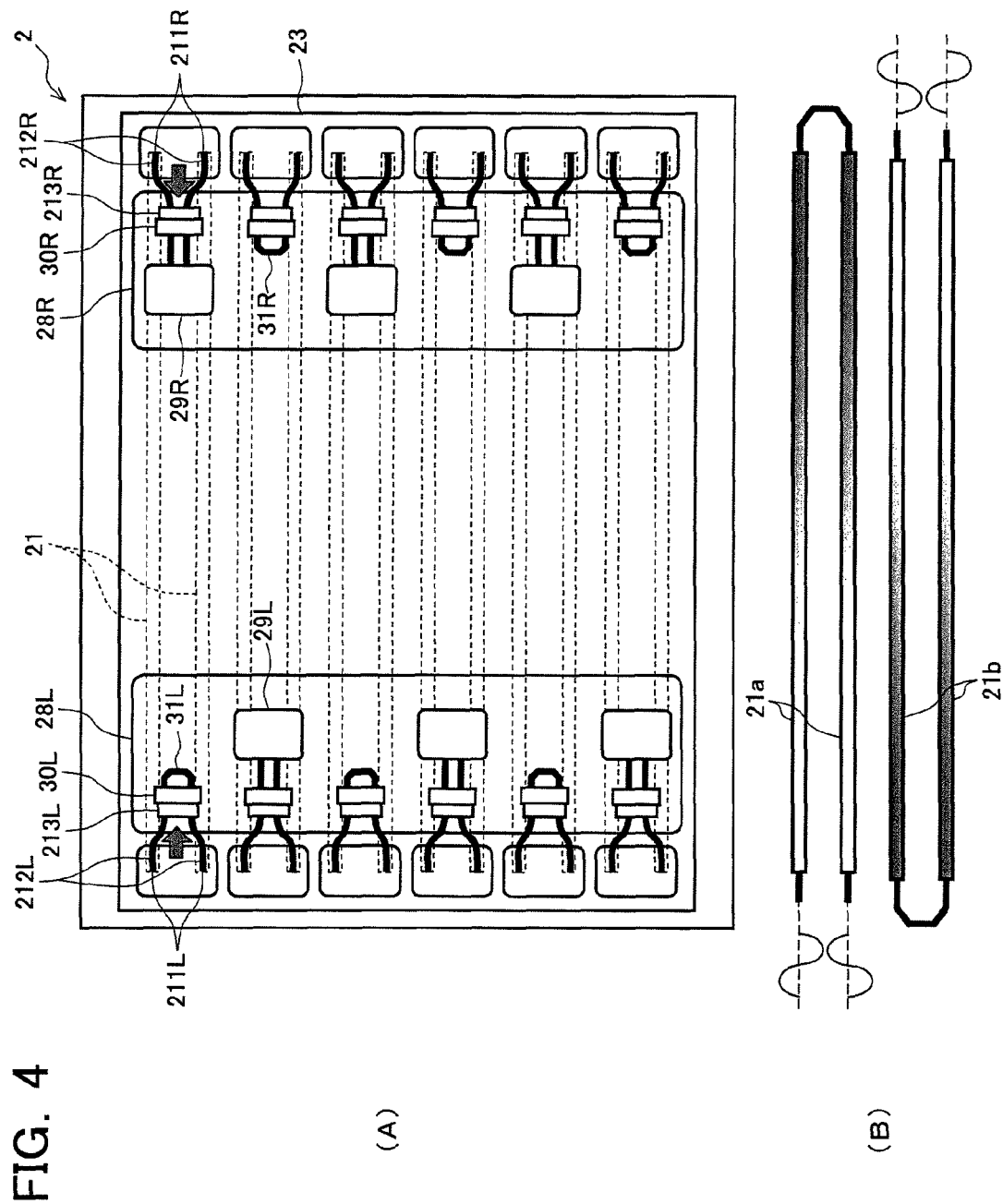
FIG. 4 is a view of an exemplary configuration of a backlight device according to a third embodiment of the present invention.

FIG. 4 is a view of an exemplary configuration of the backlight device 2 according to a third embodiment of the present invention. In FIG. 4(A), the backlight device 2 has the same configuration as that of the first embodiment except that the inverter transformer 29 and the first connecting member 30 have different configurations. The first connecting member 30 of this embodiment is connected to the bundling member 213 from the fluorescent tube unit and supplies the high alternating voltage from the inverter transformer 29 on the inverter circuit substrate 28 to both of the electrodes 211 of the fluorescent tube unit. The inverter transformer 29 may be disposed one for the both electrodes 211 to supply the high alternating voltage to the both electrodes 211. Therefore, the fluorescent tube unit is driven on both sides by the one inverter transformer 29.

The above configuration can acquire the same effect as that acquired by alternately disposing the electrode sides and the bent sides of the conventional bent-tube fluorescent lamps. Since the high-voltage sides and the low-voltage sides of fluorescent tube units (21a, 21b) are alternately disposed as shown in FIG. 4(B), the luminance difference in the tube axis direction may be reduced and the backlight luminance nonuniformity may be reduced or eliminated.

Figure 5:
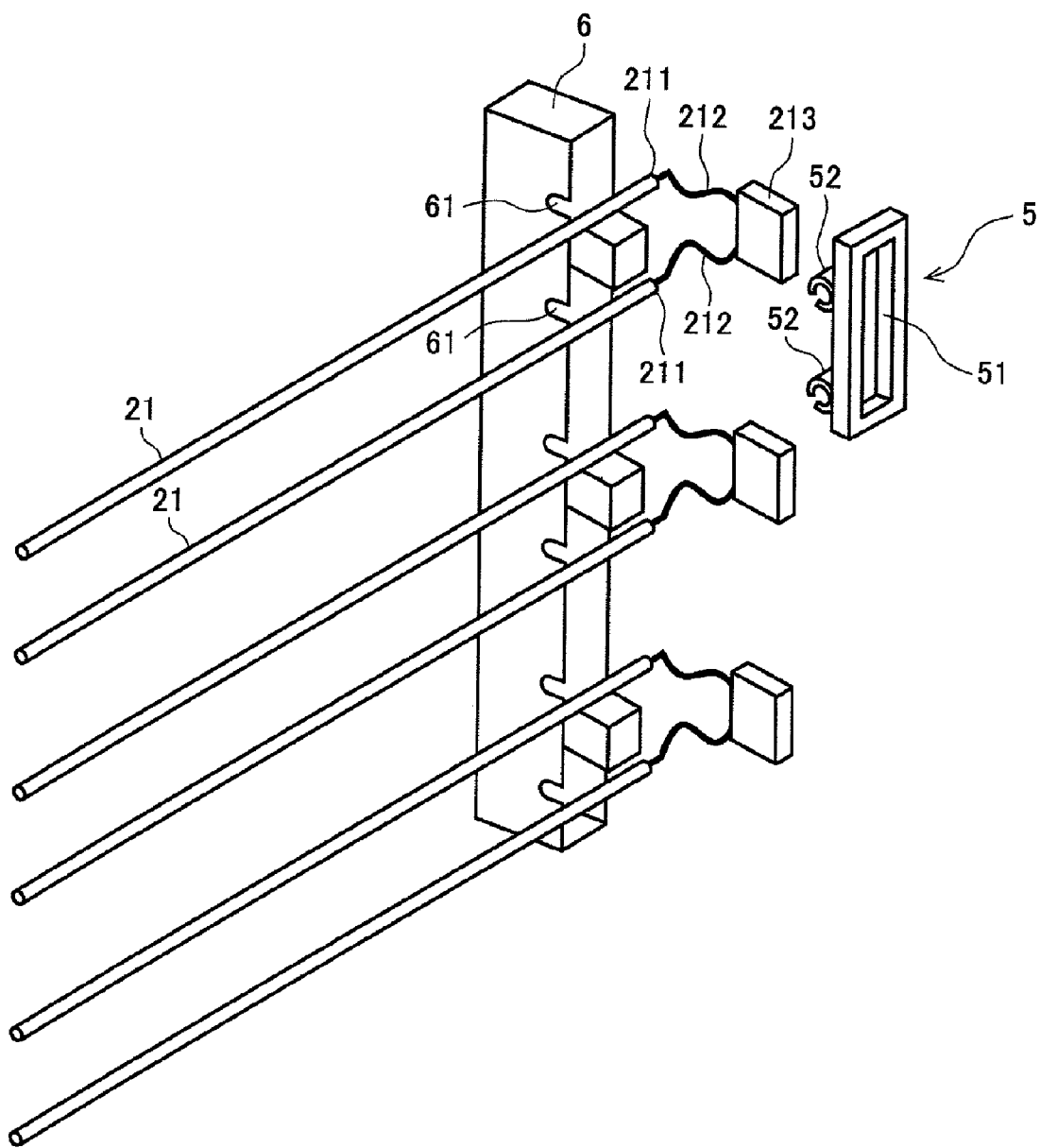
FIG. 5 is a view for explaining an example of a method for assembling the backlight device of the present invention.
Figure 6:
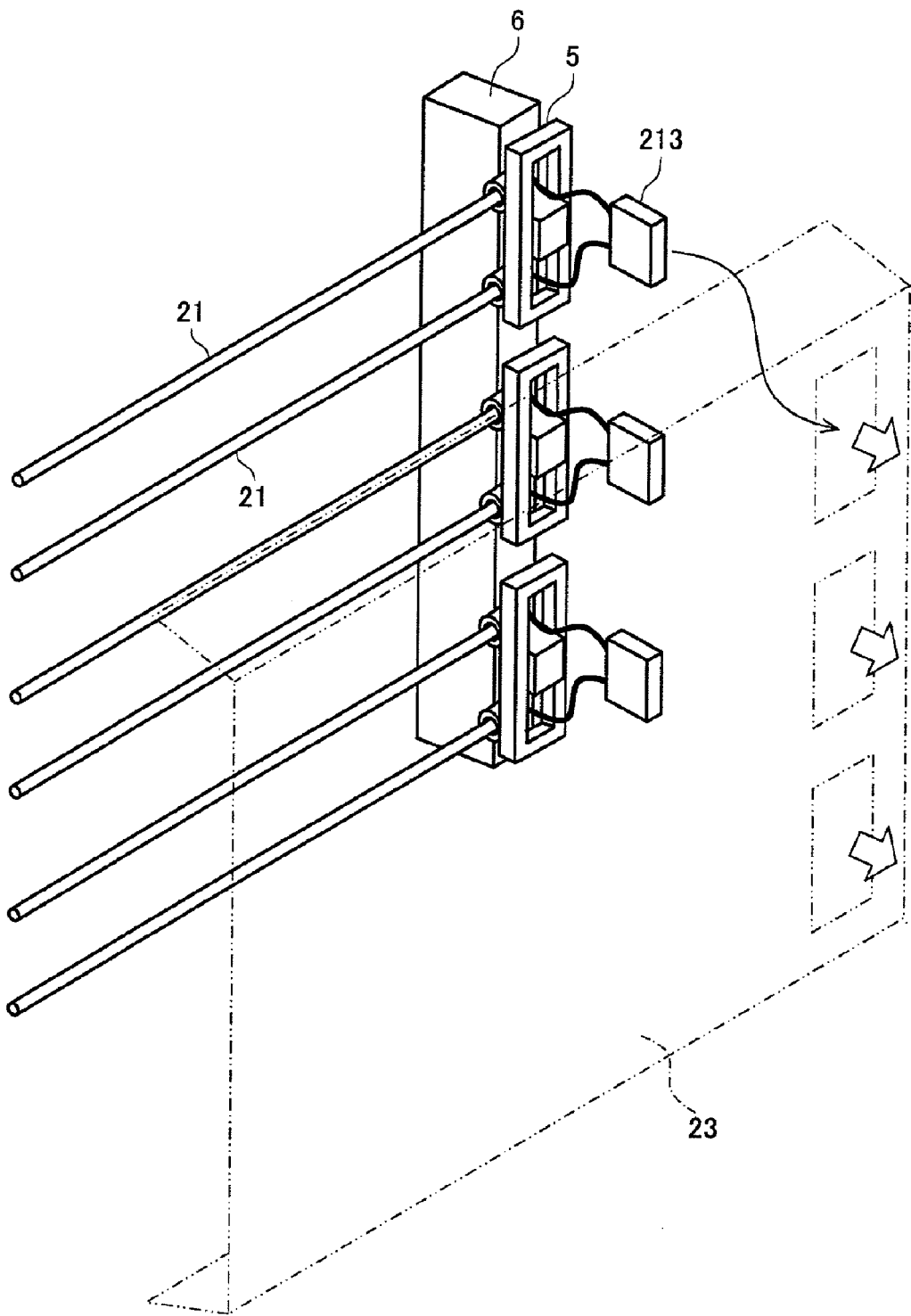
FIG. 6 is a view for explaining another example of a method for assembling the backlight device of the present invention.
Figure 7:
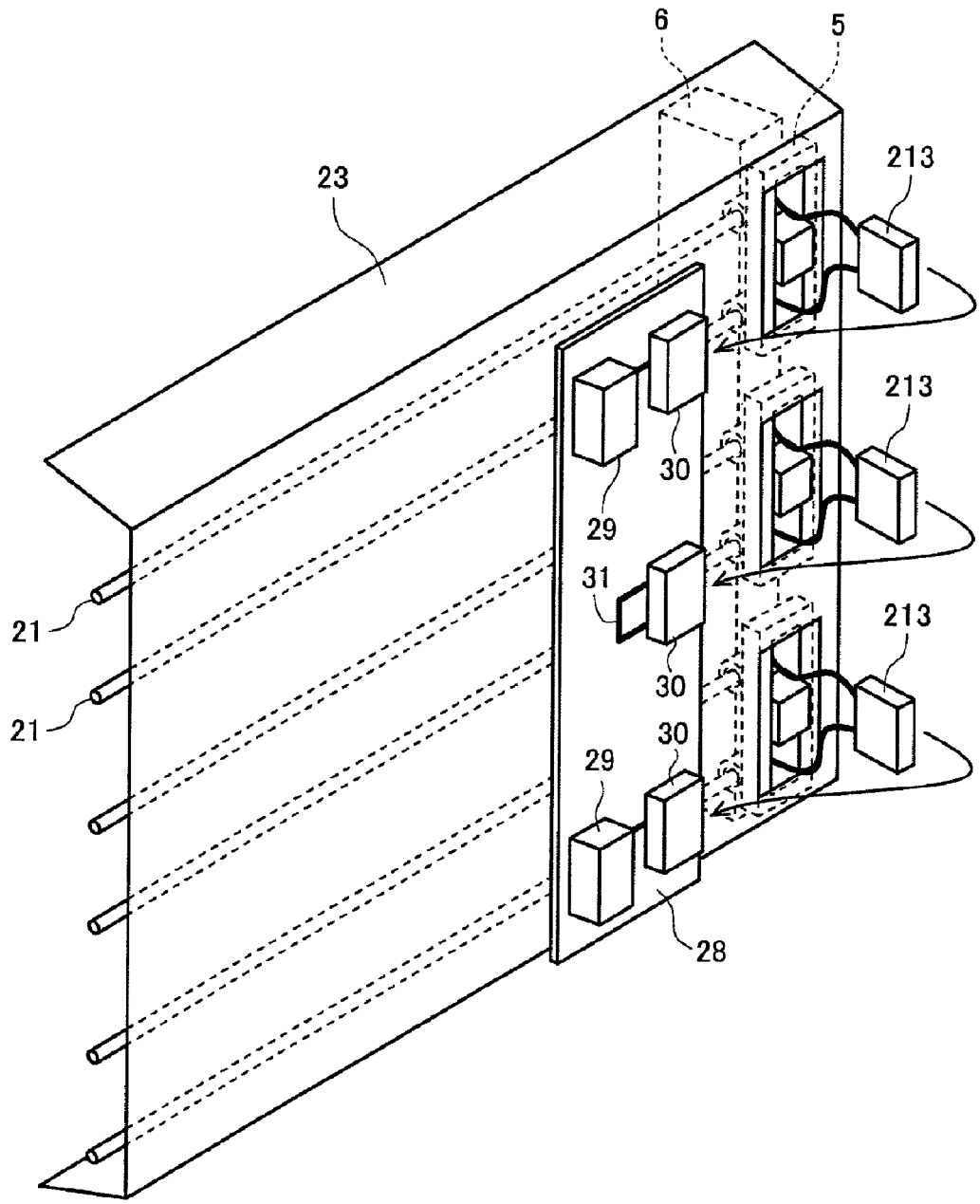
FIG. 7 is a view for explaining another example of a method for assembling the backlight device of the present invention.

FIGS. 5 to 7 are views for explaining an example of a method for assembling the backlight device 2 of the present invention. In FIGS. 5 to 7, a reference numeral 5 denotes a holding member for holding the fluorescent tubes 21 nearby the electrode portions, and 6 denotes a lamp holder for housing the fluorescent tubes 21 nearby the electrode portions. The holding member 5 includes an opening portion 51 for pulling out the wirings 212 and the bundling member 213 to the housing side and supporting portions 52 that supports the fluorescent tubes 21 nearby the electrode portions. The lamp holder 6 includes notch portions 61 for housing the fluorescent tubes 21 nearby the electrode portions.

In FIG. 5, the fluorescent tube unit composed of the two fluorescent tubes 21 and the two bundling members 213 is set nearby the electrode portions into the notch portions 61 of the lamp holder 6 and the holding members 5 are set thereon to support/fix the fluorescent tubes 21 nearby the electrode portions by the supporting portions 52. The wirings 212 and the bundling members 213 are pulled out from the opening portion 51 of the holding member 5.

The bundling members 213 pulled out from the holding member 5 are further pulled out from the housing 23 to the outside as shown in FIG. 6.

The inverter circuit substrates 28 are disposed nearby both ends of the external surface (i.e., the opposite surface of the disposition surface of the fluorescent tubes 21) of the housing 23 as shown in FIG. 7. The inverter circuit substrate 28 has an arrangement that alternately disposes the first connecting members 30 connected to the inverter transformers 29 and the second connecting member 30 connected to the conducting means 31. The first and third bundling members 213 from the top are connected to the first connecting members 30 to supply the high altering voltage from the inverter transformers 29 on the inverter circuit substrate 28 to at least one electrode of the fluorescent tube unit through the first connecting members 30, and the second bundling member 213 is connected to the second connecting member 30 to achieve the conduction between the electrodes on the other side of the fluorescent tube unit through the second connecting member 30.

Fourth Embodiment

Figure 8:
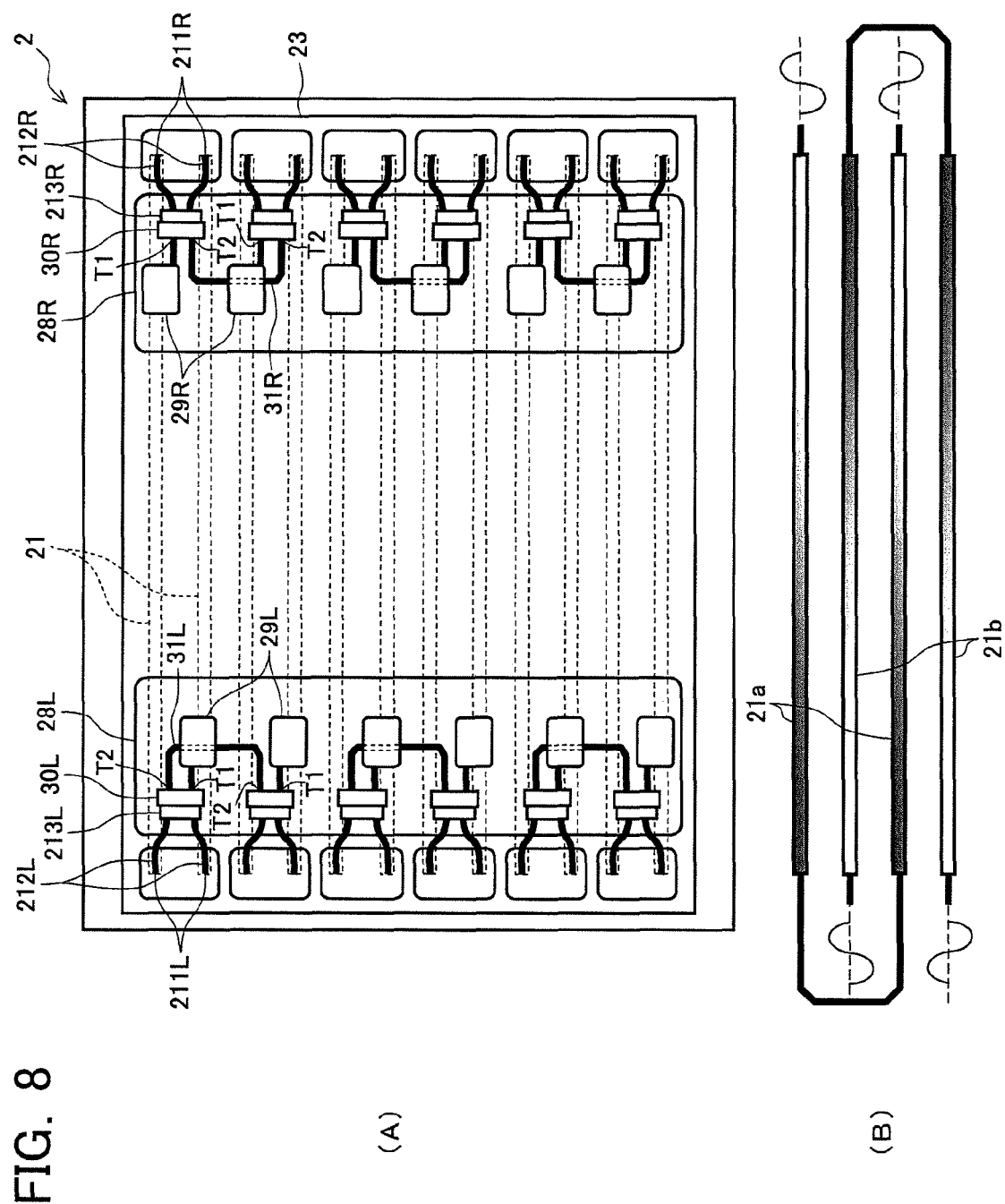
FIG. 8 is a view of an exemplary configuration of a backlight device according to a fourth embodiment of the present invention.

FIG. 8 is a view of an exemplary configuration of the backlight device 2 according to a fourth embodiment of the present invention. In FIG. 8(A), the conducting means 31 achieve the conduction between any one of the electrodes 211 of the fluorescent tubes 21 bundled by one bundling member 213 of the two adjacent bundling members 213 and one of the electrodes 211 of the fluorescent tubes 21 bundled by the other bundling member 213 with one fluorescent tube disposed between both electrodes and are arranged such that no overlapping occurs on each of the inverter circuit substrates 28. The bundling members 213 bundle the electrodes 211 at both ends and, at each end, one of the electrodes 211 is connected to the conducting means 31 through the bundling member 213 and the other electrode 211 is connected to the inverter transformer 29 through the bundling member 213. Therefore, the high-voltage electrodes 211 connected to the inverter transformers 29 are alternately arranged on the inverter circuit substrates 28 for every fluorescent tube, and the luminance nonuniformity in the tube axis direction may be reduced or eliminated.

In this case, at least a portion of the conducting means 31 is located within the transformer mounting areas on the inverter circuit substrates 28. For example, the conducting means 31 may be located to pass through the underside of the inverter transformer 29. As a result, since a high-voltage line output from the inverter transformer 29 does not contact with or come close to a conductive line that is the conducting means 31, damages may be prevented from occurring due to the short-circuit phenomena or discharge phenomena generated by contacting the both lines (the high-voltage line and the conductive line).

The backlight device 2 includes the connecting member 30 for detachably connecting the bundling member 213, and the connecting member 30 is alternately provided with a first connecting terminal T1 connected to the inverter transformer 29 on the inverter circuit substrate 28 and a second connecting terminal T2 connected to the conducting means 31.

The one inverter circuit substrate 28R is alternately disposed with the high-voltage electrodes (on the side connected to the inverter transformers 29R) and the low-voltage electrodes (on the side connected to the conducting means 31R) of the fluorescent tubes from the top. Similarly, the other inverter circuit substrate 28L has an arrangement that alternately disposes the low-voltage electrodes (on the side connected to the conducting means 31L) and the high-voltage electrodes (on the side connected to the inverter transformers 29L) of the fluorescent tube units. The high-voltage electrodes 211 connected to the inverter transformers 29 (or low-voltage electrodes connected to the conducting means 31) are alternately arranged on the inverter circuit substrates 28 at every fluorescent tube.

In this embodiment, a plurality of the fluorescent tube units each of which is composed of two adjacent fluorescent tubes 21 is arranged side-by-side, and the high altering voltage is supplied from the respective inverter transformers 29 (i.e., the two inverter transformers 29) to the two electrodes 211 with one fluorescent tube placed between them. Therefore, the two fluorescent tubes connected by the conducting means 31 are driven on both sides by the inverter transformers 29.

The above configuration can acquire the same effect as that acquired by alternately disposing the electrode sides and the bent sides of the conventional bent-tube fluorescent lamps. Since the high-voltage sides are alternately disposed as shown in FIG. 8(B) at every fluorescent tube (21a, 21b), the luminance difference in the tube axis direction may be reduced and the backlight luminance nonuniformity may be reduced or eliminated.

Fifth Embodiment

Figure 9:
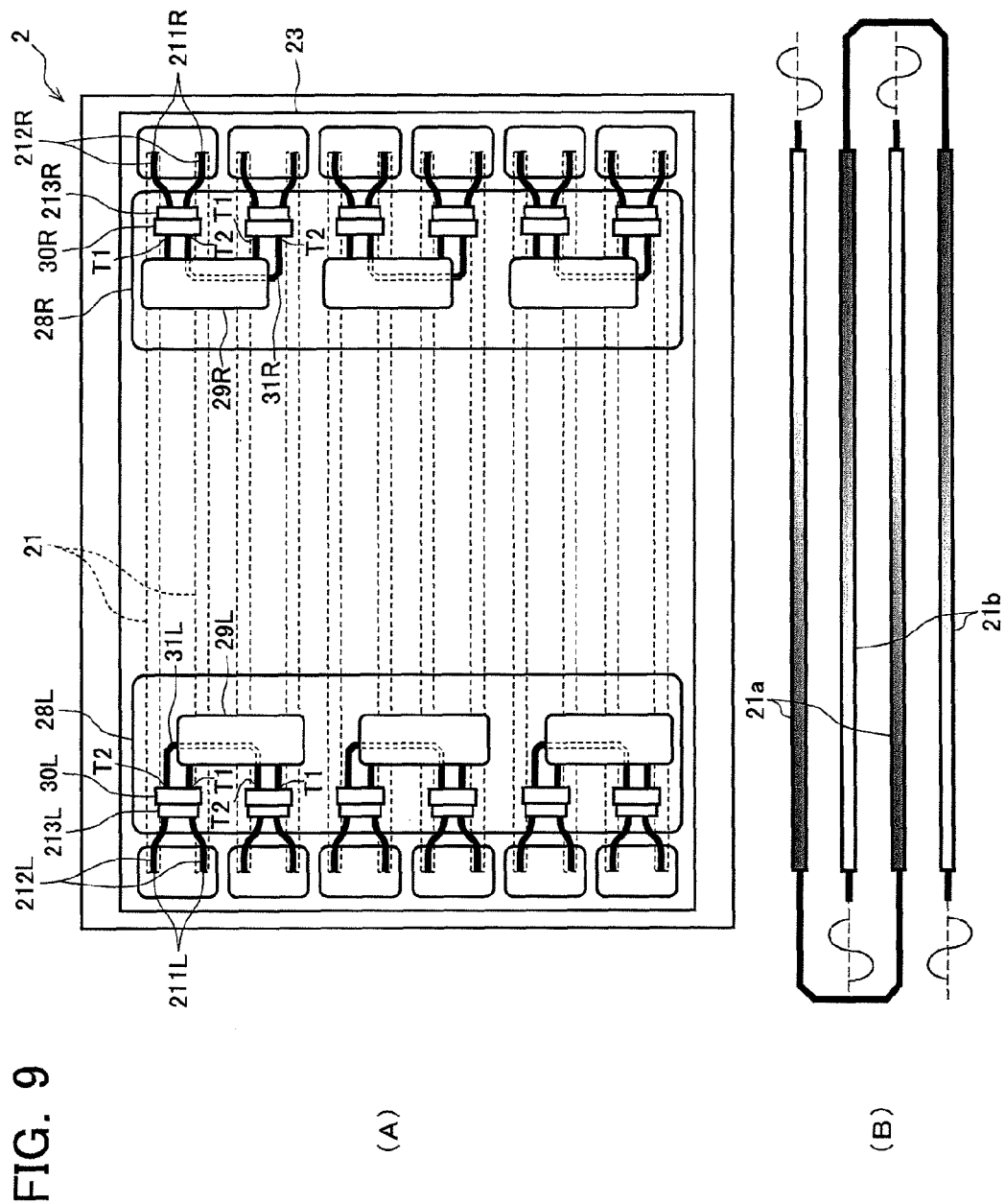
FIG. 9 is a view of an exemplary configuration of a backlight device according to a fifth embodiment of the present invention.

FIG. 9 is a view of an exemplary configuration of the backlight device 2 according to a fifth embodiment of the present invention. In FIG. 9(A), the conducting means 31 achieve the conduction between any one of the electrodes 211 of the fluorescent tubes 21 bundled by one bundling member 213 of the two adjacent bundling members 213 and one of the electrodes 211 of the fluorescent tubes 21 bundled by the other bundling member 213 with one fluorescent tube placed between both electrodes and are arranged such that no overlapping occurs on each of the inverter circuit substrates 28. The bundling members 213 bundle the electrodes 211 at both ends and, at each end, one of the electrodes 211 is connected to the conducting means 31 through the bundling member 213 and the other electrode 211 is connected to the inverter transformer 29 through the bundling member 213. Therefore, the high-voltage electrodes 211 connected to the inverter transformers 29 are alternately arranged on the inverter circuit substrates 28 for every fluorescent tube, and the luminance nonuniformity in the tube axis direction may be reduced or eliminated.

The backlight device 2 of this embodiment has the same configuration as that of the fourth embodiment except that the inverter transformer 29 and the first connecting member 30 have different configurations. In this embodiment, a plurality of the fluorescent tube units each of which is composed of two adjacent fluorescent tubes 21 is arranged side-by-side, and the high altering voltage is supplied from the one inverter transformer 29 to the two electrodes 211 with one fluorescent tube placed between both electrodes.

The above configuration can acquire the same effect as that acquired by alternately disposing the electrode sides and the bent sides of the conventional bent-tube fluorescent lamps. Since the high-voltage sides are alternately disposed as shown in FIG. 9(B) at every fluorescent tube (21a, 21b), the luminance difference in the tube axis direction may be reduced and the backlight luminance nonuniformity may be reduced or eliminated.

Figure 10:
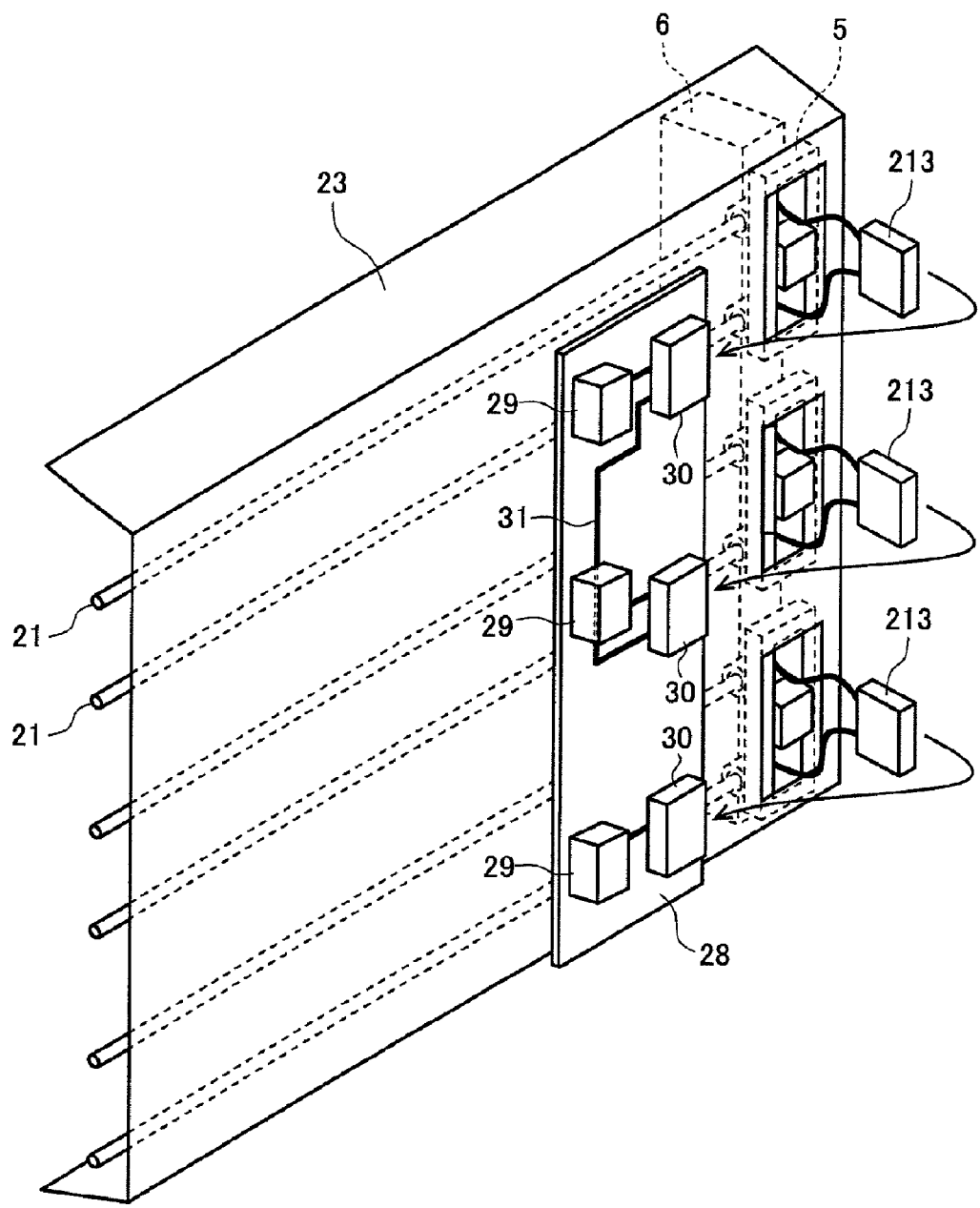
FIG. 10 is a view for explaining another example of a method for assembling the backlight device of the present invention.

A method for assembling the backlight device according to the fourth embodiment will then be described. The inverter circuit substrates 28 are disposed nearby both ends of the external surface (i.e., the opposite surface of the disposition surface of the fluorescent tubes 21) of the housing 23 as shown in FIG. 10. The connecting member 30 disposed on the inverter circuit substrate 28 is alternately provided with a first connecting terminal connected to the inverter transformer 29 and a second connecting terminal T2 connected to the conducting means 31. The first and second bundling members 213 from the top are connected to respective corresponding connecting members 30 to supply the high altering voltage to one electrode of each of the fluorescent tube units from the inverter transformers 29 connected to the first connecting terminals of the connecting members 30, and the conduction is achieved between the electrodes on the other side by the conducting means 31 connected to the second connecting terminals of the connecting members 30.

Sixth Embodiment

Figure 11:
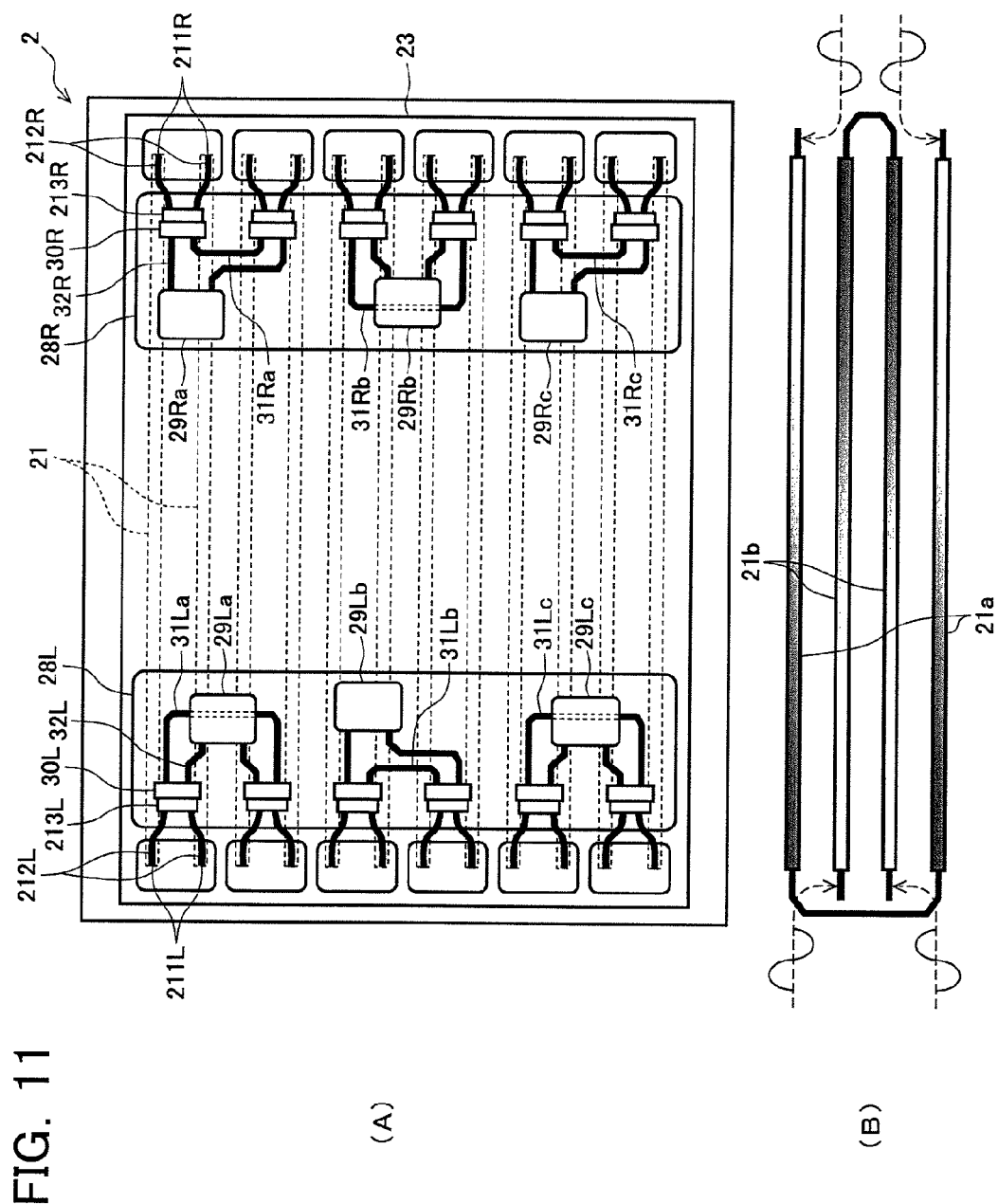
FIG. 11 is a view of an exemplary configuration of a backlight device according to a sixth embodiment of the present invention.

FIG. 11 is a view of an exemplary configuration of the backlight device 2 according to a sixth embodiment of the present invention. In FIG. 11(A), the conducting means (electrically connecting means) 31La achieve the conduction between any one of the electrodes 211L of the fluorescent tubes 21 bundled by one bundling member 213L of the two adjacent bundling members 213L and one of the electrodes 211L of the fluorescent tubes 21 bundled by the other bundling member 213L with two fluorescent tubes placed between both electrodes and are arranged such that no overlapping occurs on each of the inverter circuit substrates 28. The bundling members 213L (R) bundle the electrodes 211 at both ends of the fluorescent tubes and, at each end, one of the electrodes 211L (R) is connected to the conducting means 31La (Ra) through the bundling member 213L (R) and the other electrode 211R (L) is connected to the inverter transformer 29La (Ra) through the bundling member 213R (L).

Specifically, the two fluorescent tubes 21a driven in the U-shape through the electrically connecting means sandwiches two other fluorescent tubes (21b), and these two fluorescent tubes 21b are also driven in the U-shape through the electrically connecting means. Therefore, the high-voltage electrodes 211 connected to the inverter transformers 29L (R) are alternately arranged on the inverter circuit substrate 28L (R) for every two fluorescent tubes and the luminance nonuniformity in the tube axis direction may be reduced or eliminated.

The two fluorescent tubes sandwiched by the fluorescent tubes connected by the conducting means 31La are also connected is series by the other conducting means 31Ra provided on the other inverter circuit substrate 28R and have a configuration subjected to the floating drive by two high alternating voltages with opposite phases output from the inverter transformer 29 on the inverter circuit substrate 28L.

Other conducting means (electrically connecting means 31Lb, 31Lc) mounted on the same inverter circuit substrate are provided for the same peripheral configuration and the purpose as above and, since a plurality of the conducting means is composed on one substrate, the components of the connection mechanism of fluorescent tubes may be simplified. Similarly, other conducting means (the electrically connecting means 31Ra to 31Rc) also have the same configuration mounted on one substrate and may achieve the same effects as above.

In the backlight device 2 of the embodiment, each of the inverter transformers 29L (R) is composed of an inverter transformer that outputs two high alternating voltages in opposite phases and the configuration is the same as that of the fifth embodiment on this point. On the other hand, the configuration is different in that the fluorescent tubes sandwiching two fluorescent tubes are electrically connected. As compared to the fifth embodiment shown in FIG. 9, the embodiment is optimum when using a relatively small dual-output transformer. That is, since a terminal connected to a fluorescent tube sandwiched by two fluorescent tubes lighted by the transformer is located between two output terminals of the transformer in the specification of the transformer required for the embodiment of FIG. 9, an interval between two terminals of the transformer must be designed to be optimum with sufficient consideration given to safety distance avoiding a risk of contact between the terminal and other high-voltage wirings. On the other hand, such constraint on design is not necessary for the transformer of the embodiment of FIG. 11, and the risk of contact with high-voltage wirings may sufficiently be reduced by designing the wirings creeping under the transformer as shown by the conducting member 31La and the constraint on the size of the transformer is advantageously removed.

Therefore, the transformer to be mounted may be miniaturized as much as possible and the weight saving may easily be achieved in the design even if a lot of transformers are mounted on the inverter substrate. In this embodiment, a plurality of the fluorescent tube units each of which is composed of two adjacent fluorescent tubes 21 is arranged side-by-side, and the two high altering voltages in opposite phase are supplied from the one inverter transformers 29 to the two electrodes 211 with two fluorescent tubes placed between both electrodes. Therefore, the two fluorescent tubes connected by the conducting means 31 are driven on both sides by the inverter transformers 29.

The above configuration can acquire the same effect as that acquired by alternately disposing the electrode sides and the bent sides of the conventional bent-tube fluorescent lamps. Since the high-voltage sides are alternately disposed as shown in FIG. 11(B) with two fluorescent tubes placed between both sides, the backlight luminance nonuniformity may be eliminated without the need of giving consideration to the orientation of the fluorescent tube units.

Figure 12:
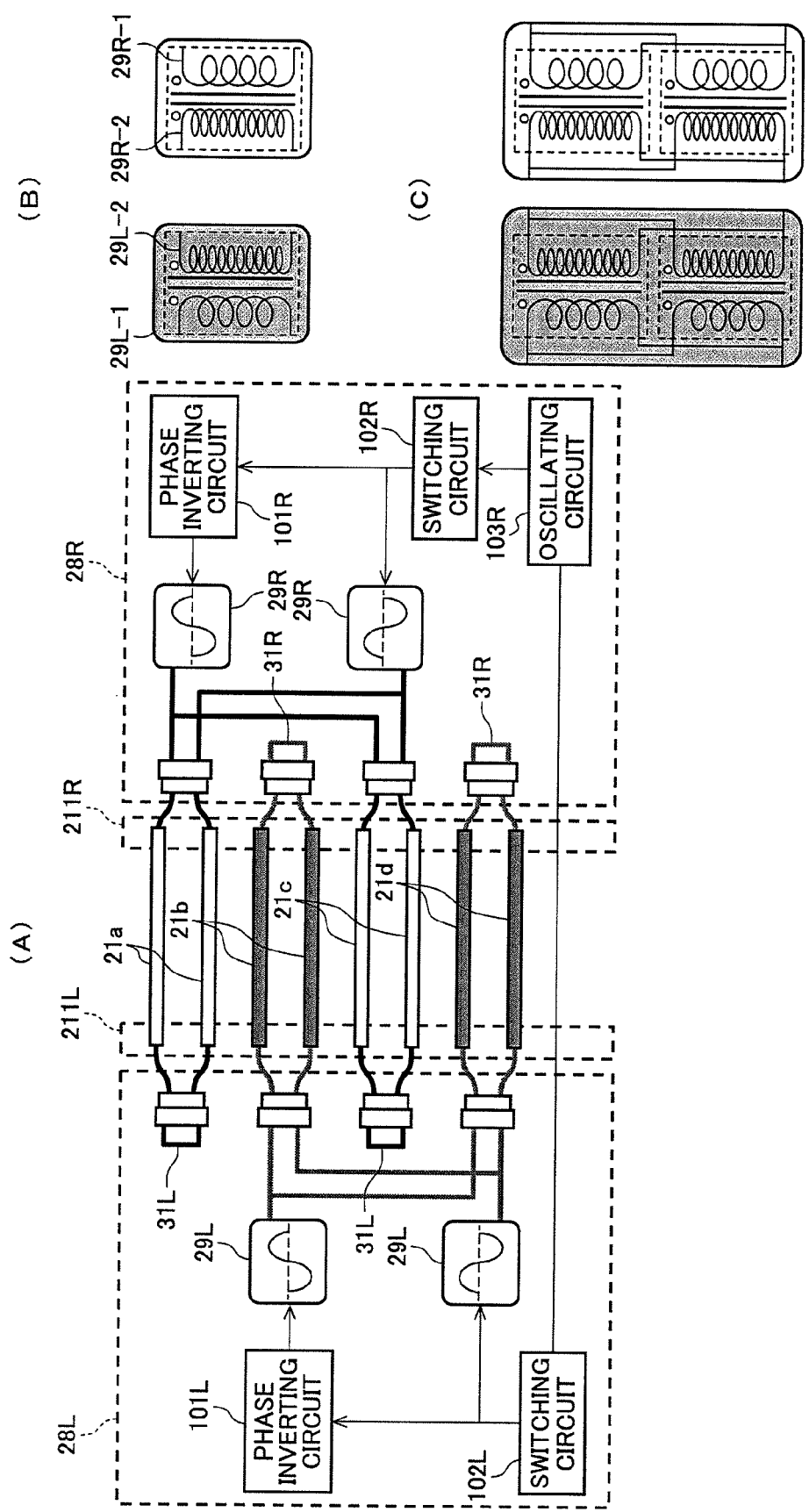
FIG. 12 is a view of an exemplary configuration of a drive circuit for fluorescent tubes according to the backlight device of the present invention.

In the embodiment of the present invention described as above, as shown in FIG. 12, the fluorescent tube unit 21a having two fluorescent tubes connected in series as one unit may be driven in a configuration connected with another fluorescent tube unit (21c) in parallel to the inverter transformer. This enables the number of components to be reduced as much as possible within the range of electric power available from the output of the inverter transformer.

Specifically, connections are made as follows. As shown in FIG. 12(A), the one inverter circuit substrate 28R includes the two inverter transformers 29R. A switch circuit 102R (e.g., composed of two or four transistors such as FETs) performs the push-pull drive with an oscillation signal output from an oscillation circuit 103R to continuously change the directions of the currents applied to the primary winding wires of the transformers in accordance with the above frequency. The electric power input to the transformers is converted into an output voltage obtained by multiplying the input voltage by a step-up ratio N corresponding to a ratio of the numbers of turns of the primary winding wire and the secondary winding wire included in the transformer to apply a high alternating voltage to the extent that the discharge phenomenon occurs in the fluorescent tubes.

A phase inverting circuit 101R is also included to maintain the opposite phase relationship in the alternating currents output from the two inverter transformers 29R. Specifically, although the transformers may have a configuration having a relationship that the second winding wires are wound in the opposite directions to the primary winding wires wound around bobbins of the respective transformers in some examples, this is not particularly a limitation, and the high voltage terminals may be connected to the fluorescent tubes such that the GND terminals and the high-voltage terminals of the respective secondary wires of the transformers having the same configuration are reversed from each other.

The high alternating voltages in opposite phase output from the two inverter transformers 29R are supplied to the two respective electrodes 211R on the other end of the unit of the two fluorescent tubes 21a serially connected through the conducting means 31L on the other substrate 28L, and the fluorescent tubes connected into the U-shape are driven in this configuration. The two high alternating voltages are also input to another unit of the two fluorescent tubes 21c and, therefore, the two fluorescent tube units 21a and 21c each of which is composed of two fluorescent tubes connected in series are connected and driven in parallel to the inverter transformers 29R.

Similarly, the fluorescent tube units 21b and 21d each of which is composed of two fluorescent tubes connected in series are connected and driven in parallel with the same configuration composed of the two inverter transformers 29L, a switch circuit 102L, a phase inverting circuit 101L, etc.

Since the fluorescent tube units 21a and 21c and 21b and 21d driven by the inverter circuit substrates 28R and 28L are alternately arranged, the luminance distribution may be balanced on the right and left sides of the screen in the longitudinal direction of the fluorescent tubes even with the reduced number of components of the transformers, and a worker may perform the assembly without being always mindful of the orientation, etc., of the fluorescent tubes.

Although the configurations of the inverter transformers have been suggested as above, the specific configurations are as shown in FIG. 12(B) and are respectively composed of primary winding wires 29R-1 and 29-L1 and secondary winding wires 29R-2 and 29-L2.

Although the above configurations are mainly applicable to the first to third embodiments, examples applicable to the fourth and fifth embodiments and the sixth embodiment will hereinafter be described.

Figure 13:
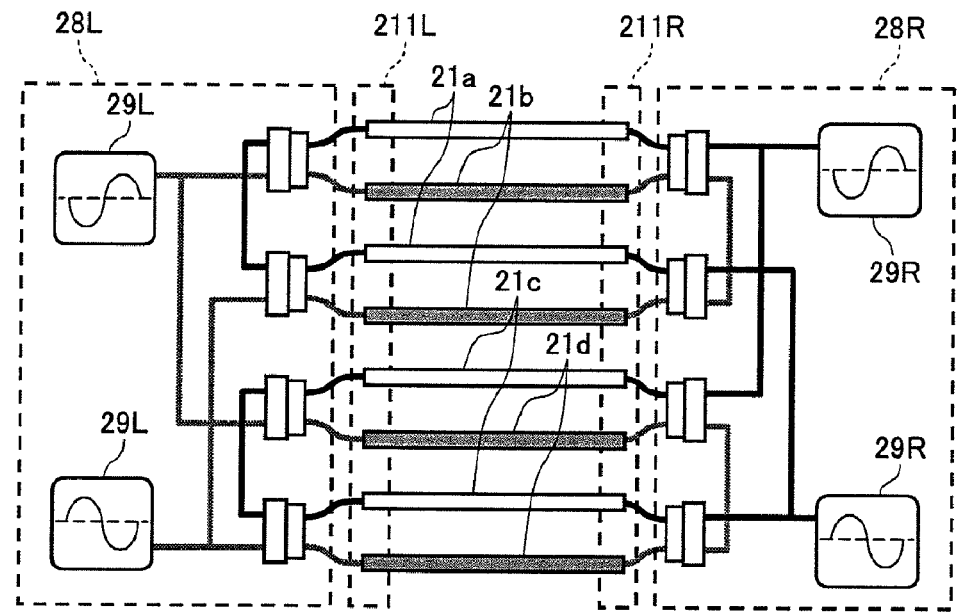
FIG. 13 is a view of an exemplary configuration of another drive circuit for fluorescent tubes according to the backlight device of the present invention.
Figure 13:
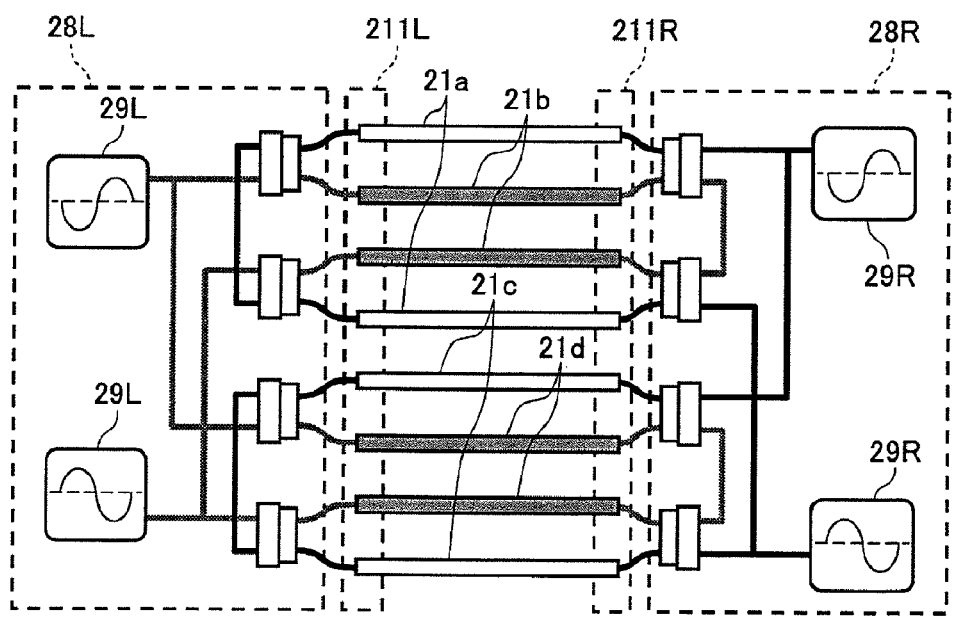

FIG. 13(A) depicts an example that two fluorescent tubes connected in series of the fluorescent tube unit 21a are alternately arranged and driven with the similar fluorescent tubes connected in series composing the another fluorescent tube unit 21b among the fluorescent tubes 21.

Similarly, the fluorescent tubes 21c serially connected in series in the same way are alternately arranged and driven with the fluorescent tubes composing the another fluorescent tube unit 21d, and the fluorescent tube units 21a and 21c are connected in parallel with each other and subjected to the floating drive by the two inverter transformers 29R outputting the high alternating voltages in opposite phase (see a connection state of black wirings and white fluorescent tubes). On the other hand, the fluorescent tube units 21b and 21d are also driven in parallel by the two high alternating voltages output from the two inverter transformers 29L (see a connection state of gray wirings and gray fluorescent tubes).

Since each of the fluorescent tubes driven by the inverter transformers 28L and 28R is alternately arranged and driven in such a configuration, the luminance nonuniformity is more easily eliminated on the screen in the parallel direction of the fluorescent tubes than alternately arranging at every two tubes as shown in FIG. 12(A) described above. Since the assembling operation may be performed without being always mindful of the orientation of the fluorescent tubes bundled by the bundling members in the assembling step of the backlight device according to the present invention, the assembling operation of the backlight device becomes easier when several tens of long (about 1 m) fluorescent tubes with a small diameter (diameter of about 5 mm) are mounted.

FIG. 13(B) depicts an example that two fluorescent tubes connected in series of the fluorescent tube unit 21a are arranged and driven sandwiching both of two fluorescent tubes connected in series of the another fluorescent tube unit 21b among the fluorescent tubes 21.

Similarly, the fluorescent tubes 21c connected in series in the same way are arranged and driven sandwiching both of two fluorescent tubes connected in series of the another fluorescent tube unit 21d, and the fluorescent tube units 21a and 21c are connected in parallel with each other and subjected to the floating drive by the two inverter transformers 29R outputting the high alternating voltages in opposite phase (see a connection state of black wirings and white fluorescent tubes). On the other hand, the fluorescent tube units 21b and 21d are also driven in parallel by the two high alternating voltages output from the two inverter transformers 29L (see a connection state of gray wirings and gray fluorescent tubes).

Since every two of the fluorescent tubes driven by the inverter transformers 28L and 28R are alternately arranged and driven in such a configuration, the luminance nonuniformity is easily eliminated on the screen in the parallel direction of the fluorescent tubes as shown in FIG. 12(A) described above. Since the assembling operation may be performed without being always mindful of the orientation of the fluorescent tubes bundled by the bundling members in the assembling step of the backlight device according to the present invention, the assembling operation of the backlight device becomes easier when several tens of long (about 1 m) fluorescent tubes with a small diameter (diameter of about 5 mm) are mounted.

Although the number of the inverter transformers 29 connecting the fluorescent tube units in parallel should be as small as possible in the examples shown in FIG. 12(A) and FIGS. 13(A) and 13(B), if the ratings (e.g., output power) of the inverter transformers are insufficient in consideration of the number, length, etc., of fluorescent tubes connected in series, each of the inverter transformers 29 may be composed of two transformers and the necessary electric power may be supplied by connecting the primary winding wires as well as the secondary wires in parallel with each other as shown in FIG. 12(C) to supply electric power to the fluorescent tube units.

In the present invention, the plurality of the fluorescent tube units 21*a* to 21*d* may be configured to be driven by one inverter circuit.

Although the exemplary configurations with the inverter circuit substrates 28 disposed on the external surface of the housing 23 (i.e., the surface opposite to the surface that the fluorescent tubes 21 are disposed) is shown in FIGS. 7 and 10 exemplarily illustrating the examples based on the present invention, one or both of the inverter circuit substrates 28L and 28R may be disposed on the internal surface of the housing 23 and, in this case, when the inverter circuit substrates 28 disposed on the internal surface of the housing are assembled to be housed by the lamp holder 6 exemplarily illustrated in FIGS. 7 and 10 along with the end portions of the fluorescent tubes, an influence on the luminance nonuniformity generated in the vicinity of the disposed inverter circuit substrates may be constrained while thinning the overall display element is realized at the same time. The same effect may be achieved in the above example of replacing the inverter circuit substrates with the substrates for connecting the fluorescent tubes in series in the above description.

Since the operation of counting the number of attached lamps and the operation of changing the way of holding a lamp are not involved even in the case of the backlight device of the fluorescent tube drive mode for lighting the fluorescent tubes connected in series according to the present invention as described above, the mounting errors or damages of the fluorescent tubes hardly occur at the time of the fluorescent-tube mounting operation, and the backlight luminance nonuniformity due to the luminance difference generated in the tube axis direction of the fluorescent tubes may be reduced or eliminated.

Since the conducting means (such as conducting lines) are printed as patters on the substrates, a thickness is not particularly necessary and the luminance nonuniformity may be eliminated in the large-size backlight with a simple configuration without the need of the mounting operation for the conducting means.

Since the conduction is achieved by the conducting means between the electrodes of the fluorescent tubes bundled by the same bundling members, a plurality of fluorescent tube units may eliminate the luminance differences likely to be generated by driving a plurality of fluorescent tubes as a fluorescent tube unit and, especially, if the floating drive is performed for the two conducting fluorescent tubes, a higher luminance nonuniformity canceling ability may be exerted.

Since the conducting means has a configuration of achieving the conduction between the two connecting members mounted on the same substrate, an arrangement may be made such that the luminance differences likely to be generated by driving a plurality of fluorescent tubes as a fluorescent tube unit are mixed among a plurality of fluorescent tube units to exert a higher luminance nonuniformity canceling ability.

Since a portion of the conducting means is wired within the transformer mounting areas on the substrate, if the high-voltage lines output from transformers, etc., and the conducting means must alternately be arranged on the substrate, the risk of contact with or coming close to each other may be eliminated, and the mixed arrangement may be achieved while preventing damages due to the potential short-circuit phenomena or discharge phenomena between the high-voltage lines and the conducting means in some designs.

The invention claimed is:

1. A backlight device having a plurality of fluorescent tubes, arranged side-by-side with electrodes at both ends, the backlight device comprising:
a bundling member that bundles wirings pulled out from electrodes at one end of the plurality of the fluorescent tubes;
a connecting member for detachably connecting the bundling member; and
a conducting means that achieves conduction between the electrodes of two of the plurality of the fluorescent tubes when the bundling member and the connecting member are connected, wherein
the conducting means are composed of a conductor provided on a pair of substrates for generating or transmitting alternating voltages for lighting the plurality of the fluorescent tubes to achieve conduction between two electrodes of the fluorescent tubes bundled by the one bundling member, and wherein
the connecting member is composed of a first connecting member connected to a transformer on the substrate and a second connecting member connected to the conducting means, and the first connecting members and the second connecting members are alternately mounted on the pair of the substrates.

2. The backlight device as defined in claim 1, wherein the conducting means achieves conduction between electrodes of two connecting members provided for detachably connecting the bundling members mounted on the same substrate.

3. The backlight device as defined in claim 2, wherein the two connecting members are adjacently mounted in the fluorescent-tube arrangement direction.

4. The backlight device as defined in claim 2, wherein the two fluorescent tubes made conductive by the conducting means are arranged to sandwich another fluorescent tube.

5. The backlight device as defined in claim 4, wherein the number of another fluorescent tube sandwiched between the two fluorescent tubes is one.

6. The backlight device as defined in claim 1, wherein the conducting means achieve the conduction between any one of the electrodes of the fluorescent tubes bundled by one bundling member of the two adjacent bundling members and one of the electrodes of the fluorescent tubes bundled by the other bundling member with one fluorescent tube disposed between both electrodes and are arranged such that no overlapping occurs on each of the pair of the substrates.

7. The backlight device as defined in claim 2, wherein at least a portion of the conducting means is wired within a transformer mounting area on each of the pair of the substrates.

8. The backlight device as defined in claim 2, wherein the connecting member includes a first connecting terminal connected to a transformer on the substrate and a second connecting terminal connected to the conducting means.

9. The backlight device as defined in claim 6, wherein the fluorescent tubes made conductive by the conducting means are driven by applying to any one electrode thereof an alternating voltage signal generated by a transformer on the substrate.

10. The backlight device as defined in claim 6, wherein the fluorescent tubes made conductive by the conducting means are driven by concurrently applying two alternating voltage signals with different phases generated by a transformer on the substrate to two electrodes thereof different from the electrodes used for making the conductive state.

11. The backlight device as defined in claim 6, wherein each of the pair of the substrates is provided on the surface opposite to the disposition surface of the plurality of the fluorescent tubes and is disposed in the vicinity of the electrodes at both ends of the plurality of the fluorescent tubes.

12. A liquid crystal display device including the backlight device as defined in claim 6 and a liquid crystal panel illuminated by the backlight device.

* * * * *